United States Patent
Gast

(10) Patent No.: US 9,853,967 B2
(45) Date of Patent: *Dec. 26, 2017

(54) PRIVATE SIMULTANEOUS AUTHENTICATION OF EQUALS

(71) Applicant: Aerohive Networks, Inc., Milpitas, CA (US)

(72) Inventor: Matthew Stuart Gast, San Francisco, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/629,331

(22) Filed: Jun. 21, 2017

(65) Prior Publication Data

US 2017/0289132 A1    Oct. 5, 2017

Related U.S. Application Data

(63) Continuation of application No. 15/238,512, filed on Aug. 16, 2016, which is a continuation of application No. 14/588,302, filed on Dec. 31, 2014, now Pat. No. 9,473,489.

(60) Provisional application No. 62/057,158, filed on Sep. 29, 2014.

(51) Int. Cl.
| | |
|---|---|
| *H04L 29/06* | (2006.01) |
| *H04L 9/08* | (2006.01) |
| *G06F 21/44* | (2013.01) |
| *H04W 12/04* | (2009.01) |
| *H04W 12/06* | (2009.01) |
| *H04L 9/32* | (2006.01) |
| *H04W 84/18* | (2009.01) |

(52) U.S. Cl.
CPC ............ *H04L 63/083* (2013.01); *G06F 21/44* (2013.01); *H04L 9/0841* (2013.01); *H04L 63/0823* (2013.01); *H04L 63/0853* (2013.01); *H04L 63/126* (2013.01); *H04W 12/04* (2013.01); *H04W 12/06* (2013.01); *H04L 9/32* (2013.01); *H04W 84/18* (2013.01)

(58) Field of Classification Search
CPC .................................................. H04L 63/0853
See application file for complete search history.

(56) References Cited

U.S. PATENT DOCUMENTS

| | | |
|---|---|---|
| 6,307,936 B1 | 10/2001 | Ober |
| 8,516,256 B2 | 8/2013 | Vogt |
| 8,583,929 B2 | 11/2013 | Patel |

(Continued)

OTHER PUBLICATIONS

U.S. Appl. No. 12/485,041, filed Jun. 16, 2009.

*Primary Examiner* — Ali Shayanfar
(74) *Attorney, Agent, or Firm* — Sheppard, Mullin, Richter & Hampton LLP

(57) ABSTRACT

A passphrase is assigned to an end user device for use in authenticating the end user device for a network using SAE. An identification of the end user device is determined during an authentication process. The passphrase assigned to the end user device is determined at a network side using the identification of the end user device. A shared secret is generated using the passphrase. Whether the end user device has generated the shared secret is determined. The end user device is authenticated for the network, if it is determined that the end user device has generated the shared secret.

18 Claims, 11 Drawing Sheets

(56) References Cited

U.S. PATENT DOCUMENTS

| | | | |
|---|---|---|---|
| 8,671,187 B1 | 3/2014 | Fu | |
| 9,319,935 B2 * | 4/2016 | Fischer | H04W 28/065 |
| 2007/0271458 A1 * | 11/2007 | Bosch | H04L 63/0853 |
| | | | 713/168 |
| 2008/0125043 A1 * | 5/2008 | Karmanenko | H04W 12/10 |
| | | | 455/41.2 |
| 2009/0016335 A1 * | 1/2009 | Bays | H04L 41/0253 |
| | | | 370/389 |
| 2009/0016355 A1 | 1/2009 | Moyes | |
| 2009/0290707 A1 | 11/2009 | Schneider | |
| 2010/0064135 A1 | 3/2010 | Thakare | |
| 2011/0087884 A1 | 4/2011 | Ho | |
| 2011/0191842 A1 * | 8/2011 | Lindholm | H04L 9/3271 |
| | | | 726/9 |
| 2011/0238822 A1 | 9/2011 | Weniger | |
| 2012/0036093 A1 * | 2/2012 | Gleason | G06N 99/005 |
| | | | 706/12 |
| 2014/0051394 A1 * | 2/2014 | Grech | H04L 63/08 |
| | | | 455/411 |
| 2014/0073289 A1 * | 3/2014 | Velasco | H04W 12/04 |
| | | | 455/411 |
| 2014/0094144 A1 | 4/2014 | Thorn | |
| 2014/0119544 A1 | 5/2014 | Lee | |
| 2014/0282960 A1 * | 9/2014 | Tinnakornsrisuphap | H04L 63/083 |
| | | | 726/7 |
| 2016/0021609 A1 * | 1/2016 | Park | H04W 48/20 |
| | | | 370/338 |
| 2016/0055485 A1 | 2/2016 | Benoit | |
| 2016/0135231 A1 * | 5/2016 | Lee | H04W 68/12 |
| | | | 370/329 |

* cited by examiner

PRIVATE SIMULTANEOUS AUTHENTICATION OF EQUALS

CROSS REFERENCE TO RELATED APPLICATIONS

This application is a continuation application of U.S. patent application Ser. No. 15/238,512, filed Aug. 16, 2016, which is a continuation application of U.S. patent application Ser. No. 14/588,302, filed Dec. 31, 2014, now U.S. Pat. No. 9,473,489, which claims the benefit of U.S. Provisional Patent Application Ser. No. 62/057,158 filed on Sep. 29, 2014, all of which are incorporated by reference herein.

BACKGROUND

An area of ongoing research and development is in improving security of networks. There are many techniques available to secure a network. An example of such a technique is requiring the use of passwords to access a given network. However, passwords have well-known weaknesses. For example, people often have trouble remembering passwords; so they use passwords that are the names of their pets or children. When longer, more complicated passwords are required, people often resort to writing the password down, which a malicious person can find and use to access the network. Even good passwords that are memorized can be picked up and potentially decrypted (or even worse, read in the clear) by an eavesdropper. So using a password, without more, might be considered inadequate.

Other limitations of the relevant art will become apparent to those of skill in the art upon a reading of the specification and a study of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

In various implementations, a passphrase is assigned to an end user device for use in authenticating the end user device for a network using simultaneous authentication of equals (SAE). Further, in various implementations, when the end user device attempts to authenticate for the network, an identification of the end user device is determined. In various implementations, the passphrase assigned to the end user device is determined at a network side using the identification of the end user device. Additionally, in various implementations, a shared secret is generated using the passphrase according to an SAE based scheme. In various implementations, whether the end user device has generated the shared secret is determined. Further, in various implementations, the end user device is authenticated for the network, if it is determined that the end user device has generated the shared secret.

These and other advantages will become apparent to those skilled in the relevant art upon a reading of the following descriptions and a study of the several examples of the drawings.

DETAILED DESCRIPTION

Figure 1:
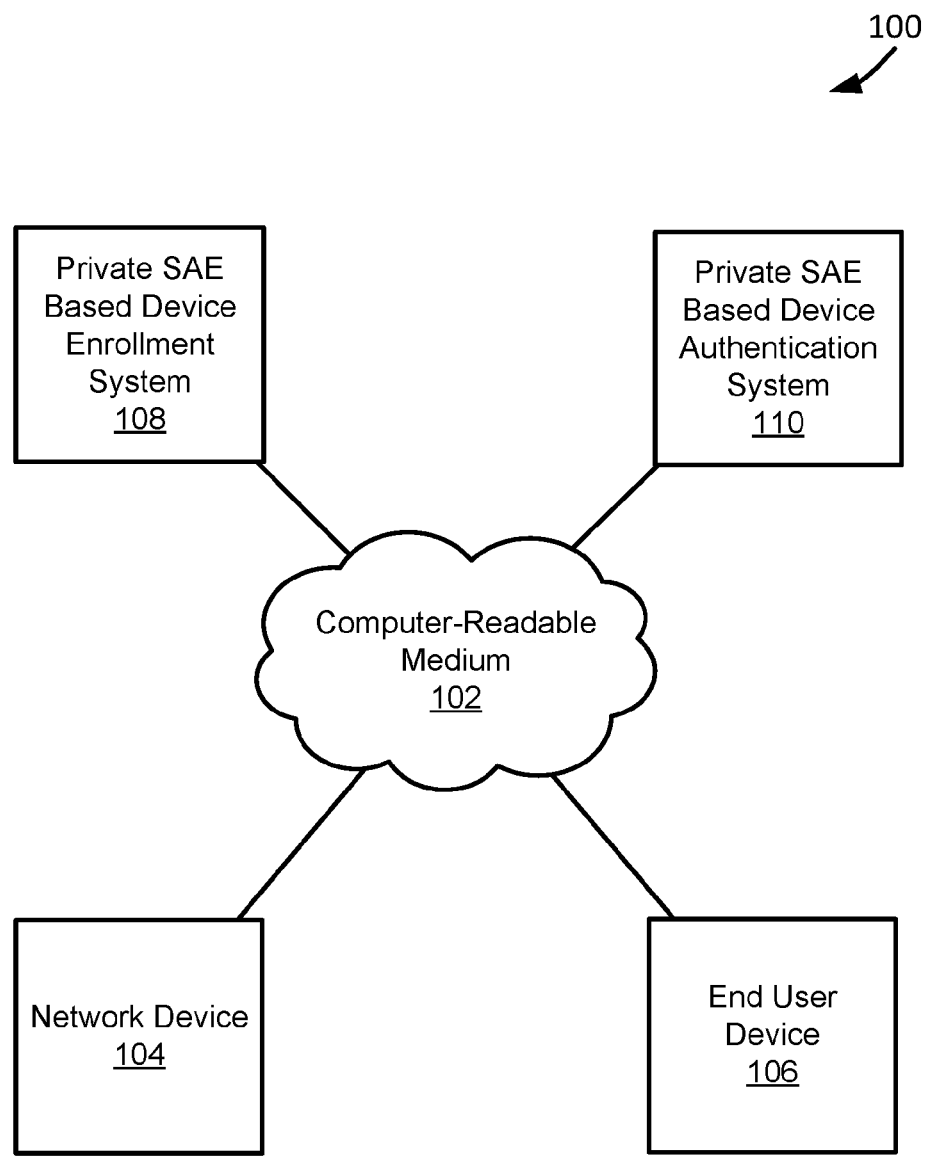
FIG. 1 depicts a diagram of an example of a system for authenticating an end user device for a network through private simultaneous authentication of equals (SAE).

FIG. 1 depicts a diagram 100 of an example of a system for authenticating an end user device for a network through private SAE. The system of the example of FIG. 1 includes a computer-readable medium 102, a network device 104 coupled to the computer-readable medium 102, an end user device 106 coupled to the computer-readable medium 102, a private SAE based device enrollment system 108 coupled to the computer-readable medium 102, and a private SAE based device authentication system 110 coupled to the computer-readable medium 102. Advantageously, private SAE provides flexibility without compromising security, thereby improving the applicable network security technology. Private SAE consumes fewer computational resources than, for example, pre-shared key (PSK) technology, thereby improving the functioning of the devices responsible for the computations.

The computer-readable medium 102 is intended to represent a variety of potentially applicable technologies. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware. For example, the computer-readable medium 102 can be used to form a network or part of a network. Where two components are co-located on a device, the CRM 102 can include a bus or other data conduit or plane. Where a first component is co-located on one device and a second component is located on a different device, the computer-readable medium 102 can include a network.

In a specific implementation, the computer-readable medium 102 includes an infrastructure network, which can be coupled to or form a part of a larger network, such as the Internet. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet. The example of FIG. 1 is intended to illustrate a computer-readable medium 102 that may or may not include more than one private network.

Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102, the network device 104, the end user device 106, the private SAE based device enrollment system 108, the private SAE based device authentication system 110, and any other applicable systems or devices described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes at least two components: 1) a dedicated or shared processor and 2) hardware, firmware, and/or software modules that are executed by the processor. Depending upon implementation-specific or other considerations, an engine can be centralized or its functionality distributed. An engine can include special purpose hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

Engines create, read, update, or delete data, which can be used by the same or other engines. As used in this paper, datastores are intended to include repositories having any applicable organization of data, including tables, comma-separated values (CSV) files, traditional databases (e.g., SQL), or other applicable known or convenient organizational formats that make the data useful to engines. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, though they are actually engines, are sometimes referred to as "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

In a specific implementation, the network device 104 is intended to represent a router, a switch, an access point, a gateway (including a wireless gateway), a repeater, or any combination thereof. In functioning as a gateway, the network device 104 can transport data from a backend of a network to a device coupled to the network device 104. In functioning as an access point, the network device 104 can couple a device coupled to the network device 104 to a network associated with the network device 104. The network device 104 can functions according to applicable protocols for forming part of a wireless network, such as Wi-Fi.

In a specific implementation, the network device 104 is wirelessly coupled through a Wi-Fi connection to an end user device, which acts as or includes a station. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the network device 104 is compliant with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, the end user device 106 functions as a supplicant; the end user device 106 can be authenticated to send and receive data through a network. Depending upon implementation-specific or other considerations, the end user device 106 can include a wireless network interface through which a wireless connection can be formed between the end user device 106 and the network device 104. The end user device 106 may or may not be implemented as a thin client or an ultra-thin client. In a specific implementation, the end user device 106 can send and receive data from the network device 106 using a derived master key after the end user device 106 is authenticated for a wireless network through the network device 106.

In a specific implementation, the private SAE based device enrollment system 108 functions to enroll the end user device 106 for private SAE on, e.g., a wireless network provided through the network device 104 and/or other network devices (not shown). Depending upon implementation-specific or other considerations, portions of the SAE based device enrollment system 108 can be implemented in whole or in part on the network device 104, in whole or in part on a private network of which the network device 104 is a part, which can include a private cloud, or in whole or in part on a remote network, such as in the cloud or on an Internet server.

In a specific implementation, in enrolling the end user device 106, the private SAE based device enrollment system 108 can assign a passphrase with which private SAE can be utilized. Depending upon implementation-specific or other considerations, the private SAE based device enrollment system 108 can assign a passphrase that it generates or assign a passphrase that the end user device 106, a user of an end user device, or a network administrator generates. Further depending upon implementation-specific or other considerations, a passphrase assigned by the private SAE based device enrollment system 108 can function as a passphrase equivalent. As used in this paper, a passphrase equivalent is a number created from the string of digits forming the passphrase.

In a specific implementation, a passphrase assigned by the private SAE based device enrollment system 108 includes a finite sequence of symbols, such as alphanumeric characters. Depending upon implementation-specific or other considerations, a passphrase assigned by the private SAE based device enrollment system 108 can be unique to the end user device 106 or unique to a subset of end user devices including the end user device 106. For example, the private SAE based device enrollment system 108 can assign a first passphrase to a first proper subset of end user devices and a second passphrase to a second proper subset of end user devices for use in performing private SAE for a wireless network.

In a specific implementation, in enrolling the end user device 106, the private SAE based device enrollment system 108 can associate a passphrase assigned to the end user device 106 with an identification of the end user device 106. The private SAE based device enrollment system 108 can determine an identification of the end user device 106 through an applicable method of determining an identification of the end user device 106. Depending upon implementation-specific or other considerations, the private SAE based device enrollment system 108 can send a query to the end user device 106 asking for the end user device 106 to return an identification of the end user device 106. An identification of an end user device can include a media access control address (hereinafter referred to as "MAC address") of the end user device, an internet protocol address (hereinafter referred to as "IP address"), or an applicable unique identification of the end user device. The private SAE based device enrollment system 108 can generate a private SAE passphrase map. As used in this paper a private SAE passphrase map is a map indicating an identification of an end user device and a passphrase assigned to the end user device for use in private SAE based authentication.

In a specific implementation, the private SAE based device authentication system 110 functions to authenticate the end user device 106 using private SAE. Depending upon implementation-specific or other considerations, portions of the private SAE based device authentication system 110 can be implemented as part of the network device 104, in what is referred to as a network side private SAE based device authentication system. Further depending upon implementation-specific or other considerations, portions of the SAE based device authentication system 110 can be implemented as part of the end user device 106, in what is referred to as a device side private SAE based device authentication system. Further depending upon implementation-specific or other considerations, portions of the private SAE based device authentication system 110 can be implemented remote from the network device 104, e.g. in the cloud.

In a specific implementation, the private SAE based device authentication system 110 can authenticate the end user device 106 for a wireless network provided through the network device 104 using private SAE. In authenticating using SAE, the private SAE based device authentication system 110 can follow protocols according to IEEE 802.11s. The private SAE based device authentication system 108 can utilize a passphrase assigned to the end user device 106, as indicated by a private SAE passphrase map, to authenticate the end user device 106 for a wireless network using private SAE. By utilizing a passphrase unique to the end user device 106 or a subset of end user devices for performing SAE based authentication, the private SAE based device authentication system 110 privately authenticates the end user device 106. In authenticating the end user device 106, the private SAE based device authentication system 110 can generate and share a key between the network device 104 and the end user device 106 according to SAE. Depending upon implementation-specific or other considerations, the private SAE based device authentication system 110 can generate and exchange a key in according with SAE, based at least in part on Diffie-Hellman key exchange.

In a specific implementation, in authenticating the end user device 106, the private SAE based device authentication system 110 can determine a passphrase assigned to the end user device 106. In determining a passphrase assigned to the end user device 106, the private SAE based device authentication system 110 can determine an identification of the end user device 106. The private SAE based device authentication system 110 can determine an identification of the end user device 106 by interacting with the end user device 106. For example, the private SAE based device authentication system 110 can determine an identification of the end user device 106 by querying the end user device 106 for its identification and receiving data from the end user device 106 indicating the identification of the end user device 106. The private SAE based device authentication system 110 can use a determined identification of the end user device 106 to determine a passphrase assigned to the end user device 106. The private SAE based device authentication system 110 can use a private SAE passphrase map generated by the SAE based device enrollment system 108 to determine a passphrase of the end user device 106 using an identification of the end user device 106.

In a specific implementation, in authenticating the end user device 106, the private SAE based device authentication system 110 can generate and exchange commitment data according to a commitment scheme during a commitment phase. The private SAE based device authentication system 110 can generate a shared secret, included as part of commitment data, that can be exchanged between the network device 104 and the end user device 106 using a passphrase assigned to the end user device 106. A network side private SAE based device authentication system can generate a shared secret while a device side private SAE can generate the same shared secret. A network side private SAE based authentication system can generate a shared secret based on commitment data received from a device side private SAE authentication system and a passphrase assigned to the end user device 106 by the private SAE based device enrollment system 108. A device side private SAE based authentication system can generate a shared secret based on commitment data received from a network side private SAE authentication system and a passphrase assigned to the end user device 106 by the private SAE based device enrollment system 108.

In a specific implementation, in authenticating the end user device 106, the private SAE based device authentication system 110 generates and exchanges confirmation data according to a confirmation scheme during a confirmation phase. In authenticating the end user device 106, the private SAE based device authentication system 110 can generate and exchange confirmation data to verify that the end user device 106 has the same shared secret as the private SAE based device authentication system 110. The private SAE based device authentication system 110 can generate a confirmation value, included as part of confirmation data, based on commit data to determine if the end user device 106 has the same shared secret as the network device 104, and subsequently confirm authentication the end user device 106 for a wireless network provided through the network device 104. A network side private SAE based authentication system can generate a confirmation key based, at least in part, on commitment data received from a device side private SAE authentication system and a generated shared secret. A device side private SAE based authentication system can generate a confirmation key based, at least in part, on commitment data received from a network side private SAE authentication system and a shared secret. Depending upon implementation-specific or other considerations, one or both of a device side private SAE based authentication system and a network side private SAE based authentication system can generate and exchange first and second confirmation values used to determine if the end user device possesses the shared secret, and subsequently complete confirmation of the end user device 106.

In a specific implementation, the private SAE based device authentication system 110 can be implemented across a plurality of network devices to allow the end user device 106 to be authenticated using private SAE as it roams. Depending upon implementation-specific or other considerations, a private SAE passphrase map generated by the private SAE based device enrollment system 108 can be shared across a plurality of network devices, including the network device 104, to allow the end user device 106 to be authenticated through SAE as the end user device 106 roams between the network devices.

In an example of operation of the example system shown in FIG. 1, the end user device 106 is wirelessly coupled to the network device 104. In the example of operation of the example system shown in FIG. 1, the private SAE based device enrollment system 108 assigns a passphrase to the end user device 106 for use in performing SAE based authentication of the end user device 106 for a wireless network provided by the network device 104. Further, in the example of operation of the example system shown in FIG. 1, the private SAE based device authentication system 110 authenticates the end user device 106 based on SAE using the passphrase assigned to the end user device 106.

Figure 2:
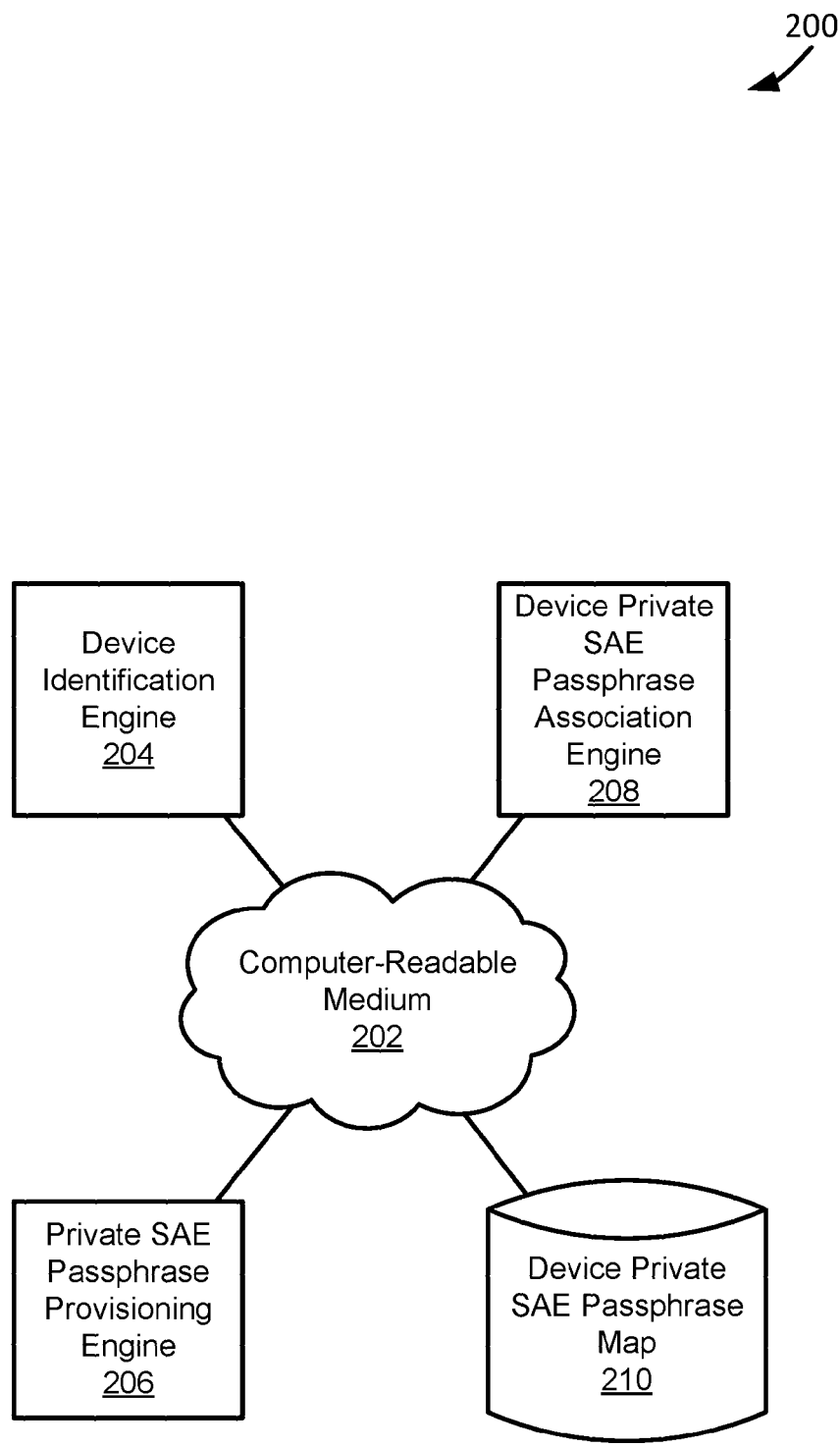
FIG. 2 depicts a diagram of an example of a private SAE based device enrollment system.

FIG. 2 depicts a diagram 200 of an example of a private SAE based device enrollment system. The example system shown in FIG. 2 includes a computer-readable medium 202, a device identification engine 204 coupled to the computer readable medium 202, a private SAE passphrase provisioning engine 206 coupled to the computer readable medium 202, a device private SAE passphrase association engine 208 coupled to the computer readable medium 202, and a device private SAE passphrase map datastore 210 coupled to the computer readable medium 202.

In a specific implementation, the device identification engine 204 functions to determine an identification of an end user device (see, e.g., FIG. 1, the end user device 106). Depending upon implementation-specific or other considerations, the device identification engine 204 can determine the identification of the end user device the first time the end user device initiates a private SAE process (or the private SAE process is initiated on the end user device's behalf) required to obtain network services through a network device (see, e.g., FIG. 1, the network device 104). Private SAE may or may not be required for all end user devices that are authenticated on the network.

In a specific implementation, the device identification engine 206 queries an end user device for its identification by sending an identification discovery message through a network device to the end user device. (The device identification engine 206 may or may not be implemented on the network device.) The end user device can return a message to the network device which includes an identification of the end user device, e.g. MAC address, which the device identification engine 206 can use to determine the identification of the end user device. In an alternative, an end user device can send its identification without being queried, such as in response to detecting a beacon frame, during an association process, or at some other time.

In a specific implementation, the private SAE passphrase provisioning engine 208 functions to assign a passphrase to an end user device for use in private SAE. The private SAE passphrase provisioning engine 208 can assign a passphrase generated by the end user device, a user of the end user device, or generated by the private SAE passphrase provisioning engine 208 itself. Depending upon implementation-specific or other considerations, a passphrase assigned to the end user device can be unique to the end user device and only assigned to the end user device. Alternatively or in addition, a passphrase assigned to the end user device can be assigned to a proper subset of end user devices that includes the end user device.

In a specific implementation, the private SAE passphrase provisioning engine 208 can transmit an assigned passphrase to an end user device. For example, the private SAE passphrase provisioning engine 208 can transmit an assigned passphrase to the end user device using a wireless connection (first channel) formed between the network device 204 and the end user device or using a second channel that is different than the first channel. Depending upon implementation-specific or other considerations, the SAE passphrase provisioning engine 208 can cause the end user device to download a passphrase assigned to the end user device.

In a specific implementation, the device private SAE passphrase association engine 208 functions to generate and/or update a private SAE passphrase map. A private SAE passphrase map generated by the device private SAE passphrase association engine 208 includes an identification of end user devices and passphrases assigned to the end user devices. Depending upon implementation-specific or other considerations, a proper subset of end user devices in a private SAE passphrase map can have the same passphrase. In generating and/or updating a private SAE passphrase map, the device private SAE passphrase association engine 208 can use an identification of a device, as determined by the device identification engine 204 and a passphrase assigned to the device by the private SAE passphrase provisioning engine 206.

In a specific implementation, the device private SAE passphrase map datastore 210 functions to store private SAE passphrase map data. Private SAE passphrase map data can indicate a private SAE passphrase map. In generating and/or updating a private SAE passphrase map, the device private SAE passphrase association engine 208 can generate and/or update private SAE passphrase map data stored in the device private SAE passphrase map datastore 210.

In an example of operation of the system illustrated in the example of FIG. 2, an end user device attempts to obtain network services through a network device. In this example of operation, the device identification engine 204 determines an identification of the end user device and the private SAE passphrase provisioning engine 206 assigns a passphrase in association with the end user device. The device private SAE passphrase association engine 208 generates private SAE passphrase map data using the identification of the end user device and the passphrase assigned to the end user device, which the device private SAE passphrase association engine 208 stores in the device private SAE passphrase map datastore 210. The resulting private SAE passphrase map includes data sufficient to facilitate private SAE of the end user device on the network.

Figure 3:
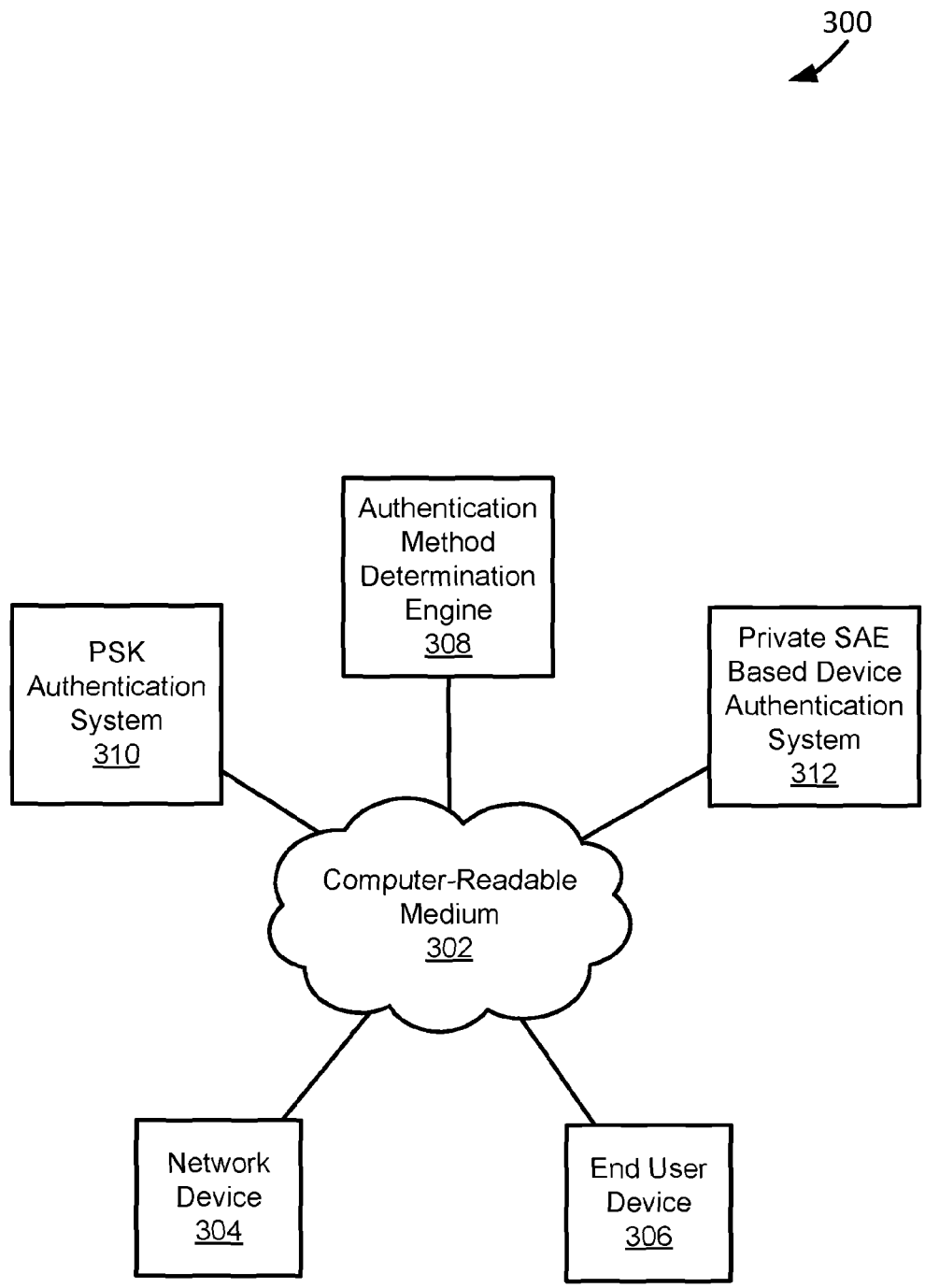
FIG. 3 depicts a diagram of an example of a system for authenticating an end user device for a network provided through a network device.

FIG. 3 depicts a diagram 300 of an example of a system for authenticating an end user device for a network provided through a network device. The example system shown in FIG. 3 includes a computer-readable medium 302, a network device 304, an end user device 306, an authentication method determination engine 308, a PSK authentication system 310, and a private SAE based device authentication system 312. In the example system shown in FIG. 3, the network device 304, the end user device 306, the authentication method determination engine 308, the PSK authentication system 310, and the private SAE based device authentication system 312 are coupled to each other through the computer-readable medium 302.

The computer readable medium 302 can be implemented in a manner similar to, e.g., the computer readable medium 102 (FIG. 1); the network device 304 can be implemented in a manner similar to, e.g., the network device 104 (FIG. 1); and the end user device 306 can be implemented in a manner similar to, e.g., the end user device 106 (FIG. 1).

In a specific implementation, the authentication method determination engine 308 functions to determine an authentication method a user of the end user device 306 prefers, is capable of, and/or is allowed to use in authenticating the end user device 306 for a network provided through the network device 304. Depending upon implementation-specific or other considerations, portions of the authentication method determination engine 308 can be implemented at the network device 304. Further depending upon implementation-specific or other considerations, portions of the authentication method determination engine 308 can be implemented remote from the network device 304. Depending upon implementation-specific or other considerations, portions of the authentication method determination engine 308 can be implemented at the end user device 306. For example, the authentication method determination engine 308 can include an application executing at the end user device 306. Further in the example, the application executing at the end user device 306 can query the end user device 306 and/or a user of the end user device 306, whether they would prefer to be authenticated to access a network provided through the network device 304 through PSK or private SAE.

In a specific implementation, the PSK authentication system 310 functions according to an applicable system for performing PSK authentication of the end user device 306 through the network device 304, such as is described in U.S. patent application Ser. No. 12/485,041 to Li et al. filed Jun. 16, 2009, which is incorporated by reference. The PSK authentication system 310 can authenticate the end user device 306 according to a PSK scheme if it is determined by the authentication method determination engine 308 to authenticate the end user device 306 through PSK mechanisms. Depending upon implementation-specific or other considerations, portions of the PSK authentication system 310 can be implemented at the network device 304 in what is referred to as a network side PSK authentication system. Further depending upon implementation-specific or other considerations, portions of the PSK authentication system 310 can be implemented at the end user device 306 in what is referred to as a device side PSK authentication system.

In a specific implementation, the PSK authentication system 310 functions to generate and exchange data for authenticating the end user device 306 through a PSK mechanism. In generating and exchanging data for authenticating the end user device 306, a network side PSK authentication system can generate and send a first nonce to a device side PSK authentication system. Further in generating and exchanging data for authenticating the end user device 306, a device side PSK authentication system can generate and send a second nonce and a message integrity code (hereinafter referred to as "MIC") based on the first nonce, to a network side PSK authentication system. Depending upon implementation, specific or other considerations, the PSK authentication system 310 functions to generate and exchange data for authenticating the end user device 306 through a private PSK mechanism.

In a specific implementation, the private SAE based device authentication system 312 functions according to an applicable system for authenticating an end user device using SAE, such as the private SAE based device authentication systems described in this paper. The SAE based device authentication system 312 can authenticate the end user device 306 if the authentication method determination engine 308 determined to authenticate the end user device 306 using SAE. Depending upon implementation-specific or other considerations, portions of the private SAE based device authentication system 312 can be implemented as part of the network device 304, in what is referred to as a network side private SAE based device authentication system. Further depending upon implementation-specific or other considerations, portions of the SAE based device authentication system 312 can be implemented as part of the end user device 306, in what is referred to as a device side private SAE based device authentication system. Further depending upon implementation-specific or other considerations, portions of the private SAE based device authentication system 312 can be implemented remote from the network device 104, e.g. in the cloud. In authenticating the end user device 306 using SAE, the private SAE based device authentication system 312 can determine a passphrase assigned to the end user device 306. Further in authenticating the end user device 306 using SAE, the private SAE based device authentication system 312 can generate and exchange commitment data during a commitment phase according to a commitment scheme. Additionally, in authenticating the end user device 306 using SAE, the private SAE based device authentication system 312 can generate and exchange confirmation data during a confirmation phase according to a confirmation scheme.

In an example of operation of the example system shown in FIG. 3, the end user device 306 is coupled to the network device 304 and attempting to authenticate for a network provided through the network device 304. In the example of operation of the example system shown in FIG. 3, the authentication method determination engine 308 determines an authentication method by which to authenticate the end user device 306. Further, in the example of operation of the example system shown in FIG. 3, the PSK authentication system authenticates the end user device 306 using PSK if it is determined by the authentication method determination engine 308 to authenticate the end user device 306 using PSK. In the example of operation of the example system shown in FIG. 3, the private SAE based device authentication system 312 authenticates the end user device 306 using SAE if it is determined by the authentication method determination engine 308 to authenticate the end user device 306 using SAE.

Figure 4:
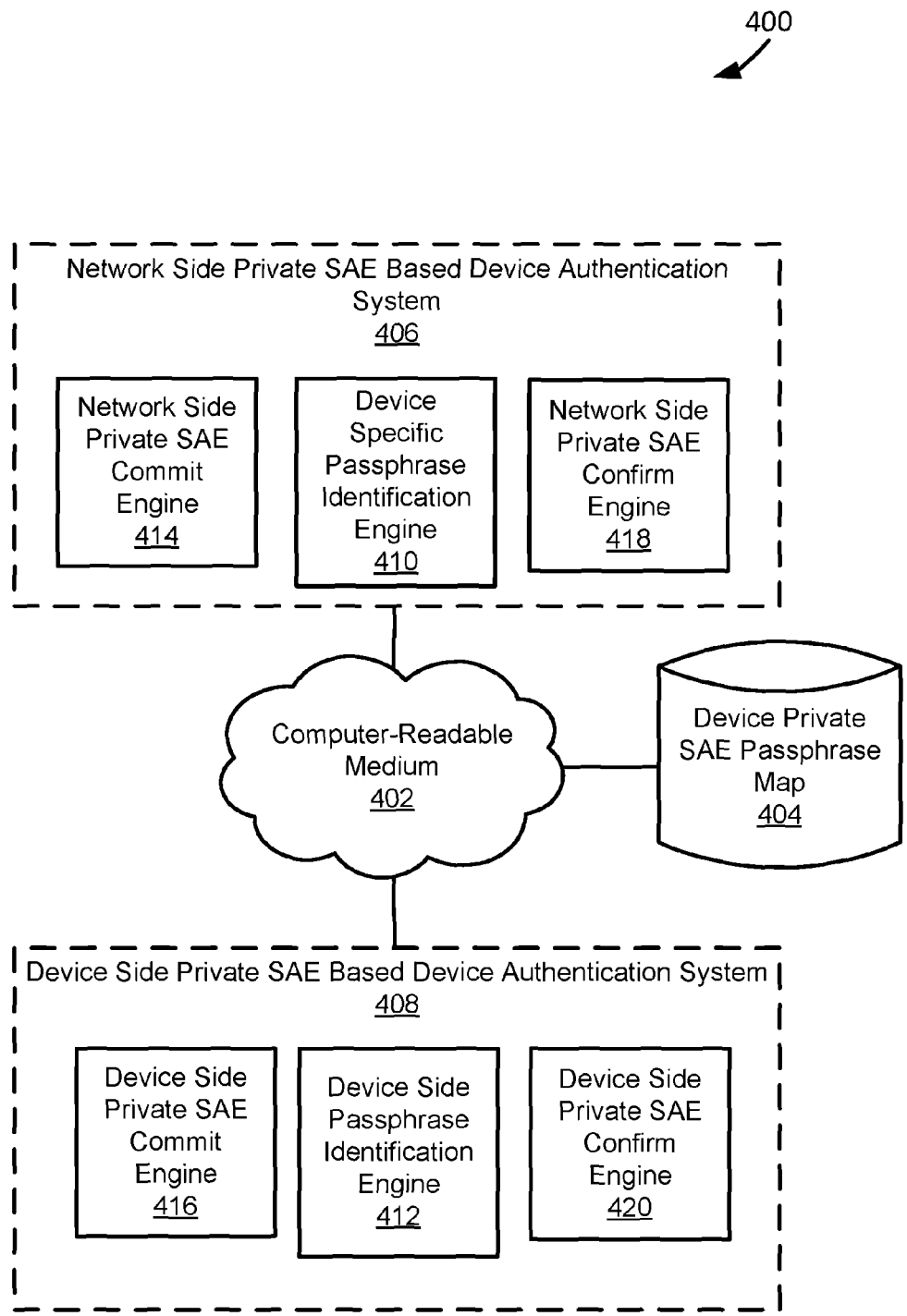
FIG. 4 depicts a diagram of an example of a private SAE based device authentication system.

FIG. 4 depicts a diagram 400 of an example of a private SAE based device authentication system. The example system shown in FIG. 4 includes a computer-readable medium 402, a device passphrase SAE passphrase map datastore 404, a network side private SAE based device authentication system 406, and a device side private SAE based device authentication system 408. In the example system shown in FIG. 4, the device private SAE passphrase map datastore 404, the network side private SAE based device authentication system 406, and the device side private SAE based device authentication system 408 are coupled to each other through the computer-readable medium 402.

In a specific implementation, the device private SAE passphrase map datastore 404 functions according to an applicable datastore for storing private SAE passphrase map data, such as the device private SAE passphrase map datastores described in this paper. Private SAE passphrase map data indicating a private SAE passphrase map. Depending upon implementation-specific or other considerations, the device private SAE passphrase map datastore 404 can store private SAE passphrase map data generated and/or updated by an applicable system for assigning a passphrase to an end user device for use in SAE based authentication, such as the private SAE based device enrollment systems described previously. Depending upon implementation-specific or other considerations, the device private SAE passphrase map datastore 404 can be implemented at a network device or remote from a network device. In a specific implementation, the device private SAE passphrase map datastore 404 is located in whole or in part on a network device, such as an access point. In an alternative implementation, the device private SAE passphrase map datastore 404 is located within the network side private SAE based device authentication system 406 (e.g., on a private network). In an alternative implementation, the device private SAE passphrase map datastore 404 is located remotely, e.g., in the cloud, and is accessible via a channel that excludes any wireless network that utilizes a device-passphrase pair stored in the device private SAE passphrase map datastore 404 for private SAE.

The network side private SAE based device authentication system 406 functions according to an applicable system for performing network side authentication of an end user device using private SAE, such as the private SAE based device authentication systems described in this paper. Portions of the network side private SAE based device authentication system 406 can be implemented at a network device and/or remote from the network device. The network side private SAE based device authentication system 406 can determine an identification of an end user device that is attempting to authenticate for a network provided through a network device. Depending upon implementation-specific or other considerations, the network side private SAE based device authentication system 406 can use an identification of an end user device and private SAE passphrase map data stored in the device private SAE passphrase map datastore 404 to determine a passphrase assigned to the end user device. The network side private SAE based device authentication system 406 can use a passphrase assigned to an end user device and received commitment data to generate and send commitment data according to a commitment scheme of a commitment phase in authenticating the end user device using private SAE. The network side private SAE based device authentication system 406 can use a passphrase assigned to an end user device and/or generated and exchanged commitment data to generate and exchange confirmation data according to a confirmation scheme of a confirmation phase in authenticating the end user device using private SAE.

The device side private SAE based device authentication system 408 functions according to an applicable system for performing device side authentication of an end user device using private SAE. Depending upon implementation-specific or other considerations, portions of the device side private SAE based device authentication system 408 can be implemented as an application executing at an end user device. The device side private SAE based device authentication system 408 can determine a passphrase assigned to an end user device. Depending upon implementation-specific or other considerations, the device side private SAE based device authentication system 408 can determine a passphrase assigned to an end user device by retrieving the passphrase from local storage at the end user device. Further depending upon implementation-specific or other considerations, the device side private SAE based device authentication system 408 can determine a passphrase assigned to an end user device using private SAE passphrase map data stored in the device private SAE passphrase map datastore 404. The device side private SAE based device authentication system 408 can use a passphrase assigned to an end user device and received commitment data to generate and send commitment data according to a commitment scheme of a commitment phase in authenticating the end user device using SAE. The device side private SAE based device authentication system 408 can use a passphrase assigned to an end user device and/or generated and exchanged commitment data to generate and exchange confirmation data according to a confirmation scheme of a confirmation phase in authenticating the end user device using private SAE.

In the example system shown in FIG. 4, the network side private SAE based device authentication system 406 includes a device specific passphrase identification engine 410. In a specific implementation, the device specific passphrase identification engine 410 functions to determine, at the network side, a passphrase assigned to an end user device for use in performing private SAE. The device specific passphrase identification engine 410 can function to determine an identification of an end user device, using an applicable method for determining the identification of the end user device. For example, the device specific passphrase identification engine 410 can send identification discovery messages to the end user device requesting that the end user device return its identification. Further in the example, the device specific passphrase identification engine 410 can receive an identification of an end user device through an interface of the network device, in response to an identification discovery message.

In a specific implementation, the device specific passphrase identification engine 410 functions to determine a passphrase assigned to an end user device based on an identification of the end user device. The device specific passphrase identification engine 410 can utilize a private SAE passphrase map represented by private SAE passphrase map data stored in the device private SAE passphrase map datastore 404 to determine an identification of the end user device. For example, the device specific passphrase identification engine 410 can look up an identification of an end user device in a private SAE passphrase map in order to determine a passphrase associated with the end user device.

In the example system shown in FIG. 4, the device side private SAE based device authentication system 408 includes a device side passphrase identification engine 412. In a specific implementation, the device side passphrase identification engine 412 can determine, at a device side, a passphrase assigned to an end user device for use in performing SAE based authentication. Depending upon implementation-specific or other considerations, the device passphrase identification engine 412 can determine a passphrase assigned to an end user device by retrieving the passphrase from local storage at the end user device, requesting entry of the passphrase by a user of the device, downloading the passphrase from a channel other than the channel on which private SAE is being attempted (e.g., through a cellular network via SMS, though a cellular network via a Web server, or the like). The passphrase is not transmitted over the network that is utilizing private SAE because that would result in a potential security breach. Moreover, it may be considered desirable to have the passphrase already stored on the end user device prior to attempting private SAE to ensure the passphrase is not transmitted over any channels at roughly the same time as private SAE is attempted.

In the example system shown in FIG. 4, the network side private SAE based device authentication system 406 includes a network side private SAE commit engine 414 and the device side private SAE based device authentication system 408 includes a device side private SAE commit engine 416. In a specific implementation, the network side private SAE commit engine 414 functions to generate and send commitment data to the device side private SAE commit engine 416. In generating commitment data, the network side private SAE commit engine 414 can generate a first random value and a first mask value.

In a specific implementation, the network side private SAE commit engine 414 generates a first scalar and a first element, included as part of commitment data from the first random value, the first mask value, and a passphrase associated with an end user device attempting to authenticate to a network. The passphrase is stored in association with an identifier of a device or set of devices in the device private SAE passphrase map datastore 404. The network side private SAE commit engine 414 can use the identifier obtained from the device specific passphrase identification engine 410 as a key to look up the passphrase in the device private SAE passphrase map datastore 404. The network side private SAE commit engine 414 can transmit the generated first scalar and first element to the device side private SAE commit engine 416. As a result, the first random value and the first mask value (and the passphrase) are not transmitted and remain at the network side private SAE commit engine 414 while still being used to generate commitment data that is transmitted.

In a specific implementation, in generating a first scalar and a first element from a first random value, a first mask value, and a passphrase associated with an end user device, the network side private SAE commit engine 414 functions to perform one or a plurality of operations. The network side private SAE commit engine 414 can generate a first scalar by adding a first random value and a first mask value and dividing the result by a relatively prime number. Depending upon implementation-specific or other considerations, the network side private SAE commit engine 414 can generate a passphrase equivalent from a passphrase assigned to an end user device. The network side private SAE commit engine 414 can generate a first element by raising a passphrase equivalent of a passphrase assigned to an end user device by the negative of a first mask value, a first random value, or an applicable combination of the first mask value and the first random value.

In a specific implementation, the device side private SAE commit engine 416 functions to generate and send commitment data to the network side private SAE commit engine 414. In generating commitment data, the device side private SAE commit engine 416 can generate a second random value and a second mask value. The second random value and the second mask value can be different from a first random value and a first mask value created by the network side private SAE commit engine 414. Further, in generating commitment data, the device side private SAE commit engine 416 can generate a second scalar and a second element, included as part of commitment data from the second random value, the second mask value, and a passphrase associated with an end user device attempting to authenticate for a network. The device side private SAE commit engine 416 can transmit the generated second scalar and second element to the network side private SAE commit engine 414. As a result, the second random value and the second mask value (and the passphrase) are not transmitted and remain at the device side private SAE commit engine 416 while still being used to generate commitment data that is transmitted.

In a specific implementation, in generating a second scalar and a second element from a second random value, a second mask value, and a passphrase associated with an end user device, the device side private SAE commit engine 416 functions to perform one or a plurality of operations. The device side private SAE commit engine 416 can generate a second scalar by adding a second random value and a second mask value and dividing the result by a relatively prime number. Depending upon implementation-specific or other considerations, the device side private SAE commit engine 416 can generate a passphrase equivalent from a passphrase assigned to an end user device. The device side private SAE commit engine 416 can generate a second element by raising a passphrase equivalent of a passphrase assigned to an end user device by the negative of a second mask value, a second random value, or an applicable combination of the second mask value and the second random value.

In a specific implementation, the network side private SAE commit engine 414 functions to generate a shared secret. The network side private SAE commit engine 414 can generate a shared secret from a second scalar and a second element received from a device side private SAE commit engine 416. In generating a shared secret, the network side private SAE commit engine 414 can raise a passphrase equivalent of a passphrase assigned to an end user device by a second scalar received from the device side private commit engine 416, multiply the result by the second element received form the device side private commit engine 416, raise the product to the power of a first random value or a first mask value generated by the network side private SAE commit engine 414, and divide the result by the group. Depending upon implementation-specific or other considerations, a shared secret generated by the network side private SAE commit engine 414 is the same as a shared secret generated by the device side private SAE commit engine 416. In having the same shared secret between a network side and device side, the secret is shared between the network side and the device side.

In a specific implementation, the device side private SAE commit engine 416 functions to generate a shared secret. The device side private SAE commit engine 416 can generate a shared secret from a first scalar and a first element received from a network side private SAE commit engine 414. In generating a shared secret, the device side private SAE commit engine 416 can raise a passphrase equivalent of a passphrase assigned to an end user device by a first scalar received from the network side private commit engine 414, multiply the result by the first element received form the network side private commit engine 414, raise the product to the power of a second random value or a second mask value generated by the device side private SAE commit engine 416, and divide the result by the group. Depending upon implementation-specific or other considerations, a shared secret generated by the device side private SAE commit engine 416 is the same as a shared secret generated by the network side private SAE commit engine 414. In having the same secret between a device side and network side, the secret is shared between the network side and the device side and is a shared secret.

In the example system shown in FIG. 4, the network side private SAE based device authentication system 406 includes a network side private SAE confirm engine 418. Additionally, in the example system shown in FIG. 4, the device side private SAE based device authentication system 408 includes a device side private SAE confirm engine 420. In a specific implementation, the network side private SAE confirm engine 418 can generate and send confirmation data to the device side private SAE confirm engine 420. The network side private SAE confirm engine 418 can generate a confirmation key, included as part of confirmation data. Depending upon implementation-specific or other considerations, the network side private SAE confirm engine 418 can generate a confirmation key using a key derivation function based on a shared secret generated by the network side private SAE confirm engine 418 and one or an applicable combination of a first scalar and a first element generated by the network side private SAE confirm engine 418 and a second scalar and a second element generated by the device side private SAE confirm engine 420. Further depending upon implementation-specific or other considerations, the network side private SAE confirm engine 418 can generate and send a confirmation value, included as part of confirmation data, from a generated confirmation key and one or an applicable combination of a first scalar and a first element generated by the network side private SAE confirm engine 418 and a second scalar and a second element generated by the device side private SAE confirm engine 420.

In a specific implementation, the device side private SAE confirm engine 420 can generate and send confirmation data to the network side private SAE confirm engine 418. The device side private SAE confirm engine 420 can generate a confirmation key from a shared secret generated by the device side private SAE confirm engine 420. Depending upon implementation-specific or other considerations, the device side private SAE confirm engine 420 can generate a confirmation key using a key derivation function based on a shared secret generated by the device side private SAE confirm engine 420 and one or an applicable combination of a first scalar and a first element generated by the network side private SAE confirm engine 418 and a second scalar and a second element generated by the device side private SAE confirm engine 420. Further depending upon implementation-specific or other considerations, the device side private SAE confirm engine 420 can generate and send a confirmation value, included as part of confirmation data, from a generated confirmation key and one or an applicable combination of a first scalar and a first element generated by the network side private SAE confirm engine 418 and a second scalar and a second element generated by the device side private SAE confirm engine 420.

In a specific implementation, the network side private SAE confirm engine 418 functions to confirm an end user device associated with the device side private SAE confirm engine 420 using generated confirmation data. The network side private SAE confirm engine 418 can confirm an end user device by verifying that the corresponding device side or network side has the same shared secret, using exchanged confirmation keys. Depending upon implementation-specific or other considerations, the network side private SAE confirm engine 418 can confirm an end user device associated with the device side private SAE confirm engine 420 by comparing a first confirmation value generated by the network side private SAE confirm engine 418 with a second confirmation value generated by the device side private SAE confirm engine 420. For example, the network side private SAE confirm engine 418 can verify the end user device by determining if the shared secret used to generate a confirmation key by the device side private SAE confirm engine 420 is the same as the shared secret used to generate the confirmation key by the network side private SAE confirm engine 418 by comparing a confirmation value received from the device side private SAE confirm engine 420 with a confirmation value generated by the network side private SAE confirm engine 418.

In a specific implementation, the network side private SAE confirm engine 418 and the device side private SAE confirm engine 420 function to generate a master key. Depending upon implementation-specific or other considerations, a master key can be generated using, at least in part, a shared secret. Further depending upon implementation-specific or other considerations, a master key can be generated using, as least in part, one or an applicable combination of a first scalar and a first element generated by the network side private SAE confirm engine 418, and a second scalar and a second element generated by the device side private SAE confirm engine 418. A generated master key can be used to exchange data from a network device associated with the network side private SAE based device authentication system 406 and exchange data from an end user device associated with the device side private SAE based device authentication system 408.

In a specific implementation, the network side private SAE based device authentication system 406 and the device side private SAE based device authentication system 408 function to generate a shared secret every time an end user device attempts to authenticate for a network. Specifically, each of the corresponding private SAE based device authentication system 406 and the device side private SAE based device authentication system 408 can generate a different scalar and a different element, corresponding to a different random value and mask value each time an end user device attempts to authenticate. As a result, if an attacker obtains a scalar and an element generated during attempted authentication, the attacker has only one shot to attack using the obtained scalar and element to gain access to the network, practically guaranteeing any brute force efforts to guess the passphrase will fail.

In a specific implementation, the network side private SAE based device authentication system 406 functions to perform anti-clogging techniques in conjunction with SAE to prevent attacks on a network. In performing anti-clogging techniques in conjunction with SAE to prevent attacks on a network, the network side private SAE based device authentication system 406 can require an end user device, sometimes an attacker attempting to authenticate for a network, to do work. Further, in requiring an end user device to do work in attempting to authenticate for a network, the end user device can be classified as part of an active session if the end user device successfully performs the work required by the network side private SAE based device authentication system 406. Depending upon implementation-specific or other considerations, the network side private SAE based device authentication system 406 can assign tokens used in performing work according to anti-clogging techniques.

In an example of operation of the example system shown in FIG. 4, the device private SAE passphrase map datastore 404 stores private SAE passphrase map data indicating a private SAE passphrase map including an identification of a passphrase assigned to an end user device associated with the device side private SAE based device authentication system 408. In the example of operation of the example system shown in FIG. 4, the device specific passphrase identification engine 410 determines, at a network side, the passphrase assigned to the end user device using private SAE passphrase map data stored in the device private SAE passphrase map datastore 404. Further, in the example of operation of the example system shown in FIG. 4, the device side passphrase identification engine 412 determines, at a device side, the passphrase assigned to the end user device using private SAE passphrase map data stored in the device private SAE passphrase map datastore 404. It may be noted the device side passphrase identification engine 412 is not permitted to obtain the passphrase via a network secured by private SAE using the device-passphrase pair in the device private SAE passphrase map datastore 404; so to the extent the device specific passphrase identification engine 410 and the device side passphrase identification engine 412 access the same physical datastore, the access must be via a channel that excludes the private SAE-protected network. In a likely implementation, a passphrase is stored locally on an end user device during an enrollment period, which means the device private SAE passphrase map datastore 404 is implemented at at least two physical locations (on the end user device and on an AP, for example), the passphrase records may have different associated data structures, and the interfaces to the datastore may be entirely different.

In the example of operation of the example system shown in FIG. 4, the network side private SAE commit engine 414 generates and sends commitment data to the device side private SAE commit engine 416 for authentication of the end user device based on SAE during a commitment phase using the determined passphrase. Additionally, in the example of operation of the example system shown in FIG. 4, the device side private SAE commit engine 416 generates and sends commitment data to the network side private SAE commit engine 414 for authentication of the end user device based on SAE during the commitment phase using the determined passphrase. In the example of operation of the example system shown in FIG. 4, the network side private SAE commit engine 414 and the device side private SAE commit engine 416 generate a shared secret using corresponding received commitment data. In the example of operation of the example system shown in FIG. 4, the network side private SAE confirm engine 418 generates confirmation data for authentication of the end user device based on private SAE during a confirmation phase using received commitment data and the shared secret. Further, in the example of operation of the example system shown in FIG. 4, the device side private SAE confirm engine 420 generates and sends confirmation data to the network side private SAE commit engine 416 for authentication of the end user device based on SAE during a confirmation phase using received commitment data and the shared secret. In the example of operation of the example system shown in FIG. 4, the network side private SAE confirm engine 418 confirms whether the end user device is authenticated for a network based on exchanged confirmation data. Additionally, in the example of operation of the example system shown in FIG. 4, the network side private SAE confirm engine 418 and/or the device side private SAE confirm engine 420 generate a master key used by the end user device and a networking device in sending and receiving data over the network if the end user device is authenticated for the network.

Figure 5:
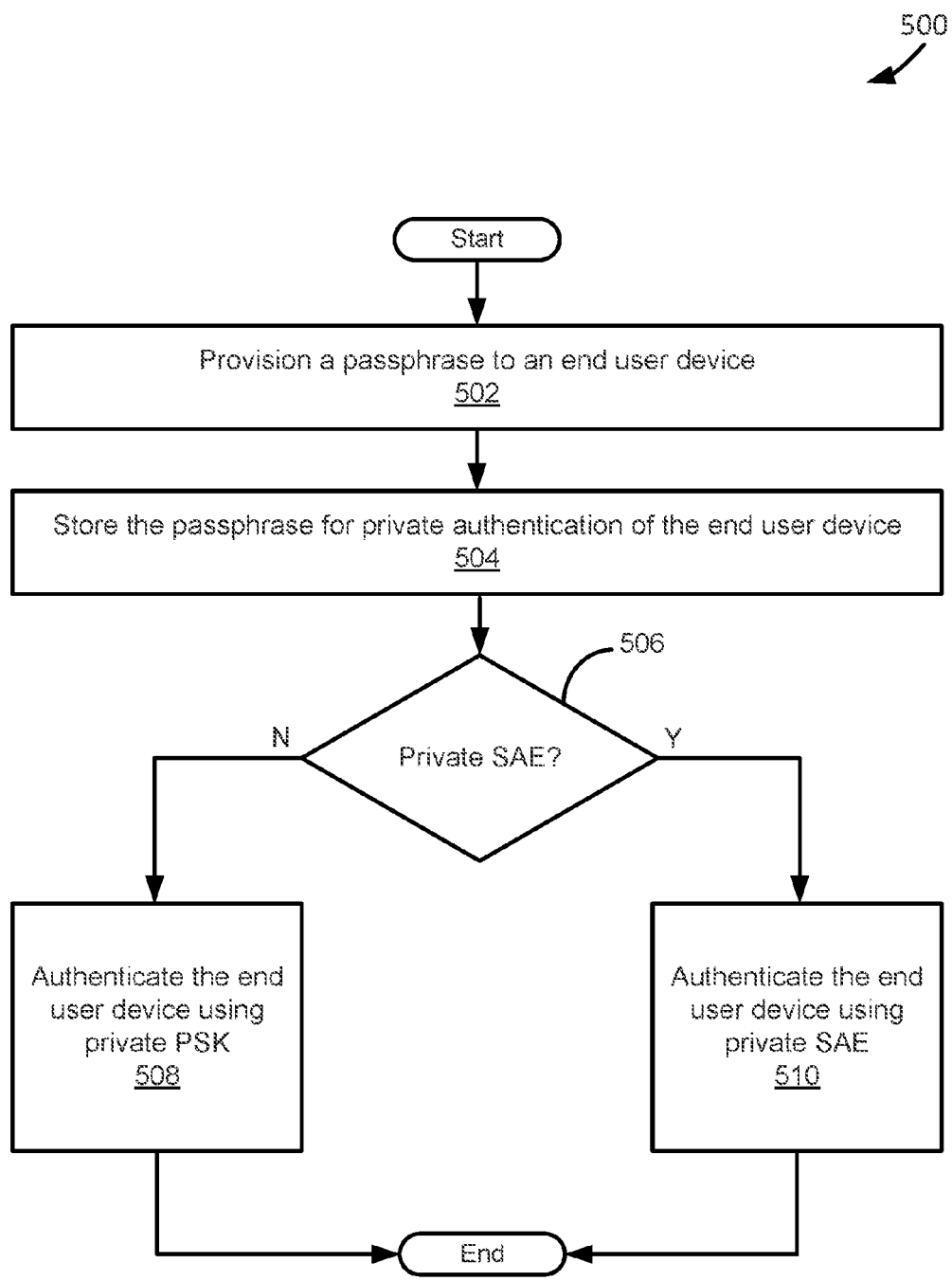
FIG. 5 depicts a flowchart of an example of a method for authenticating an end user device on a network utilizing private PSK or SAE.

FIG. 5 depicts a flowchart 500 of an example of a method for authenticating an end user device on a network utilizing private PSK or SAE. The flowchart 500 and other flowcharts described in this paper include sequential modules. However, the sequential modules can be reordered or arranged for parallel execution.

In the example of FIG. 5, the flowchart 500 begins at module 502, where a passphrase is provisioned to an end user device. A passphrase can be provisioned to an end user device using an applicable system for provisioning a passphrase to an end user device, such as the private SAE based device enrollment systems described in this paper. In some instances, the passphrase is generated and assigned in accordance with network security policy. In some instances, the person or agent enrolling the end user device can select a password, which can be limited to passwords that fall within the scope of passwords allowed in accordance with network security policy.

In the example of FIG. 5, the flowchart 500 continues to module 504 with storing the passphrase for private authentication of the end user device. A passphrase can be stored using an applicable system for storing a passphrase, such as the private SAE based device enrollment systems described in this paper. In some instances, the passphrase is stored in association with an identification of an end user device. The identification can be used as a key for lookup during a private PSK or private SAE authentication process. Depending upon implementation-specific or other considerations, a passphrase can be unique to a user, to an end user device, to a subset of users, and/or to a subset of end user devices. Because devices, and not users, are typically identified during private PSK or private SAE, it may be considered desirable to store the passphrase and device(s) in a private SAE (or PSK) passphrase map that includes an identification of an end user device and a passphrase assigned to the end user device.

In the example of FIG. 5, the flowchart 500 continues to decision point 506, where it is determined whether to use private SAE. An applicable engine for determining an authentication method can be used to determine whether to use private SAE, such as the authentication method determination engines described in this paper. Depending upon implementation-specific or other considerations, it can be determined whether to use private SAE based on input received from a user associated with the end user device, virtual LAN (VLAN) assignment, local security policy, for legacy reasons, or in accordance with determinations made during the enrollment of the end user device, to name several. If it is determined at decision point 506 to not use private SAE, then the flowchart 500 continues to module 508 where the end user device is authenticated using private PSK (PPSK). If, on the other hand, it is determined at decision point 506 to use private SAE, then the flowchart 500 continues to module 510 where the end user device is authenticated using private SAE. An applicable system for authenticating an end user device through SAE can be used to authenticate the end user device through SAE, such as the private SAE based device authentication systems described in this paper. In any case, the flowchart 500 ends after private PSK (508) or private SAE (510) are used to authenticate the end user device with the associated passphrase.

Figure 6:
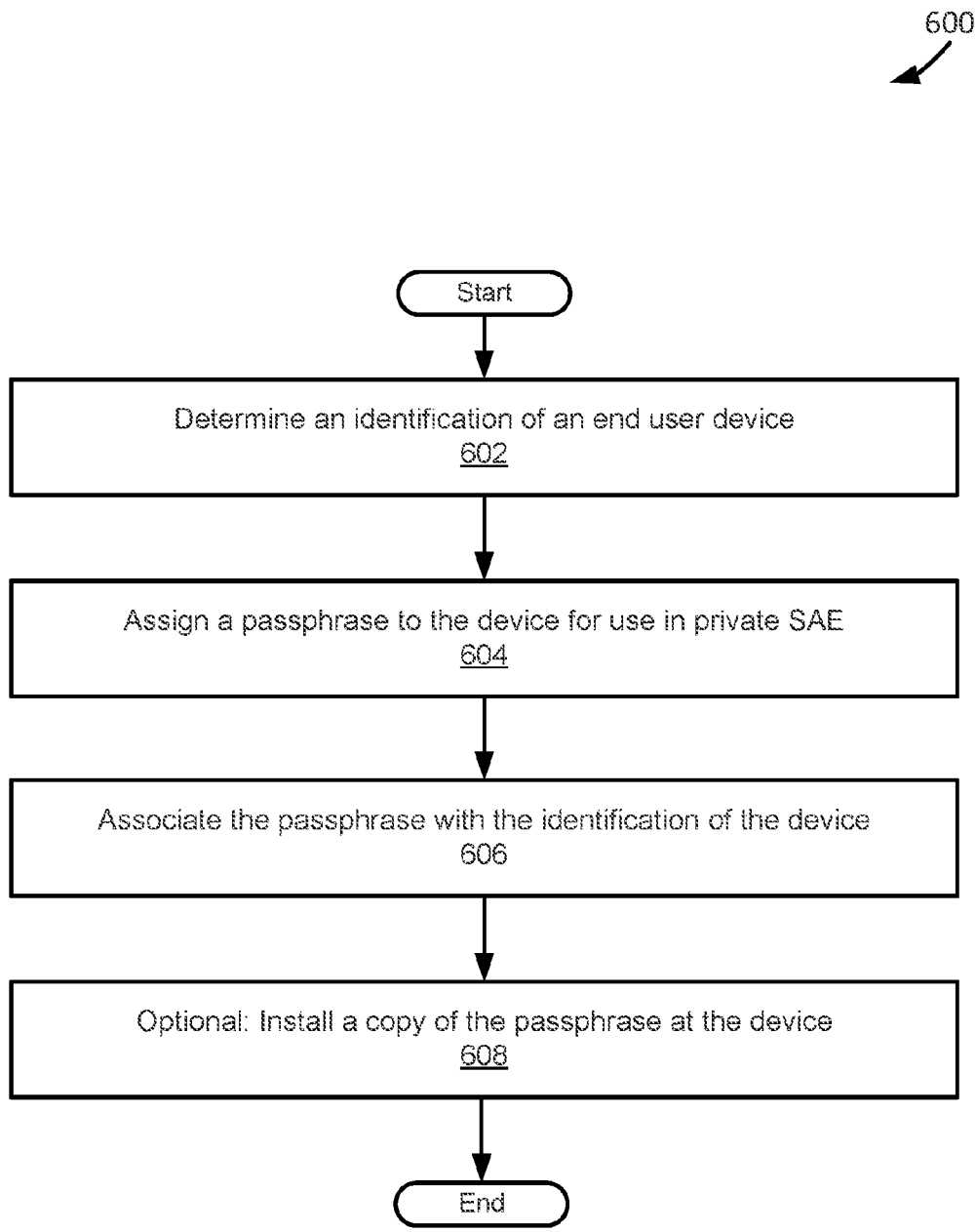
FIG. 6 depicts a flowchart of an example of a method for provisioning a passphrase to an end user device for performing private SAE of the end user device on a network.

FIG. 6 depicts a flowchart 600 of an example of a method for provisioning a passphrase to an end user device for performing private SAE of the end user device on a network. The flowchart 600 begins at module 602, where an identification of an end user device is determined. An identification of an end user device can be determined by an applicable engine for determining an identification of an end user device, such as the device identification engines described in this paper. An identification of an end user device can be returned from the end user device in response to an identification discovery message.

The flowchart 600 continues to module 604, where a passphrase for use in SAE based authentication is assigned to the end user device. A passphrase can be assigned to the end user device from an applicable engine for assigning a passphrase to the end user device, such as the private passphrase provisioning engines described in this paper. Depending upon implementation-specific or other considerations, a passphrase assigned to the end user device can be unique to the end user device. Further depending upon implementation-specific or other considerations, a passphrase assigned to the end user device can be unique to a subset of end user devices including the end user device.

The flowchart 600 continues to module 606, where the passphrase is associated with the identification of the end user device. The passphrase can be associated with the identification of the end user device through an applicable engine for associating an identification of an end user device with a passphrase assigned to an end user device, such as the device private SAE passphrase associated engines described in this paper. In associating the passphrase with an identification of the end user device, a private SAE passphrase map can be generated and or updated to include the passphrase and the identification of the end user device.

The flowchart 600 optionally continues to module 608, where a copy of the passphrase is installed locally at the end user device. The copy of the passphrase can be installed locally at the end user device by an application executing on the end user device. In installing the passphrase locally at the end user device, the end user device can retrieve the passphrase from local storage when it attempts to authenticate at a network using private SAE.

Figure 7:
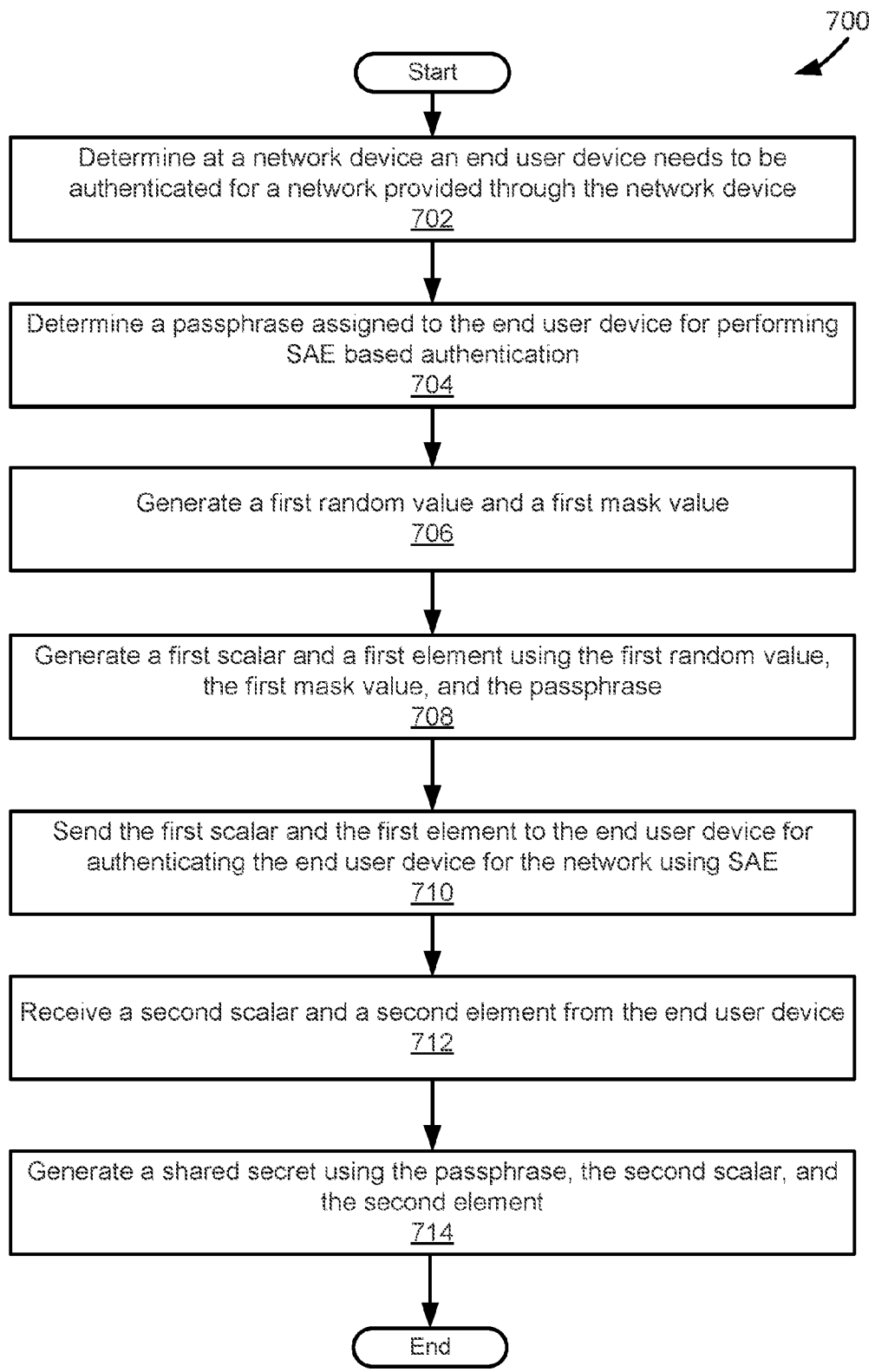
FIG. 7 depicts a flowchart of an example of a method of performing network side commitment according to a commitment scheme during a commitment phase of SAE based network authentication.

FIG. 7 depicts a flowchart 700 of an example of a method of performing network side commitment according to a commitment scheme during a commitment phase of SAE based network authentication. The flowchart 700 begins at module 702, where it is determined at a network device that an end user device needs to be authenticated for a network provided through the network device. Depending upon implementation-specific or other considerations, an end user device can be either attempting to authenticate for a network for a first time through a network device or has previously been authenticated for a network through another network device from which the end user device has roamed. An applicable system for determining an end user device needs to be authenticated for a network can determine that an end user device needs to be authenticated for a network, such as the network side private SAE device authentication systems described in this paper.

The flowchart 700 continues to module 704, where a passphrase assigned to the end user device for SAE based authentication is determined at the network side. A passphrase assigned to the end user device can be determined by an applicable engine for determining a passphrase assigned to the end user device at the network side, such as the device specific passphrase identification engines described in this paper. A passphrase assigned to the end user device can be determined from a private SAE passphrase map represented by private SAE passphrase map data. For example, an identification of the end user device can be determined and used to look up, in a private SAE passphrase map, a passphrase assigned to the end user device.

The flowchart 700 continues to module 706, where a first random value and a first mask value are generated at the network side. A first random value and a first mask value can be generated by an applicable engine for generated a random value and a mask value at the network side, such as the network side private SAE commit engines described in this paper. A first random value and a first mask value can be generated according to an applicable method for generating random numbers.

The flowchart 700 continues to module 708, where a first scalar and a first element are generated using the first random value, the first mask value, and the passphrase assigned to the end user device. A first scalar and a first element can be generated by an applicable engine for generating a first scalar and a first element, such as the network side private SAE commit engines described in this paper. Depending upon implementation-specific or other considerations, a first scalar can be generated by adding the first random value and the first mask value and dividing the result by a relatively prime number. Further depending upon implementation-specific or other considerations, a first element can be generated by raising a passphrase equivalent of the passphrase assigned to the end user device by the negative of the first mask value, the first random value, or an applicable combination of the first mask value and the first random value.

The flowchart 700 continues to module 710, where the first scalar and first element, included as part of commitment data, are sent to the end user device for use in authenticating the end user for the network using SAE. An applicable engine for sending the first scalar and the first element form the network side to the device side, such as the network side private SAE commit engines described in this paper. Depending upon implementation-specific or other considerations, the first scalar and the first element can be sent to a device side over a wireless connection coupling the end user device associated with the device side to a network device associated with the network side.

The flowchart 700 continues to module 712, where a second scalar and a second element are received at the network side from the device side. A second scalar and a second element can be received from an applicable engine for receiving a second scalar and a second element from a device side, such as the network side private SAE commit engines described in this paper. A second scalar and a second element can be generated at a device side from a second random value and a second mask value generated at the device side.

The flowchart 700 continues to module 714, where a shared secret is generated from the passphrase, the second scalar, and the second element. A shared secret can be generated by an applicable engine for generating a shared secret using the passphrase, the second scalar, and the second element, such as the network side private SAE commit engines described in this paper. A shared secret can also be generated using either one or an applicable combination of the first random value and the first mask value. Depending upon implementation-specific or other considerations, a shared secret can be generated by raising a passphrase equivalent of the passphrase assigned to the end user device by the second scalar, multiplying the result by the second element, raising the product to the power of the first random value or the first mask value, and dividing by the group.

Figure 8:
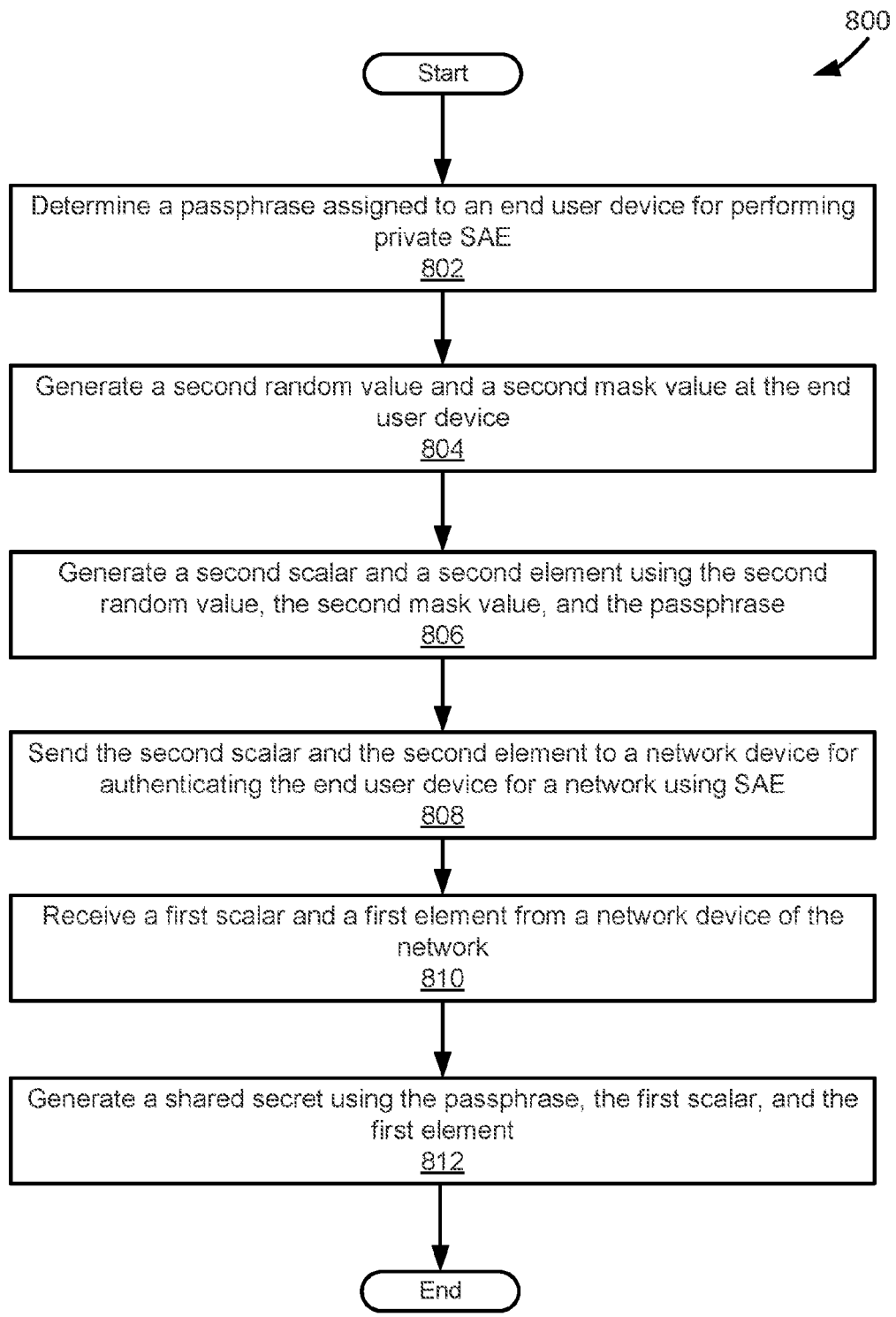
FIG. 8 depicts a flowchart of an example of a method of performing device side commitment according to a commitment scheme during a commitment phase of private SAE.

FIG. 8 depicts a flowchart 800 of an example of a method of performing device side commitment according to a commitment scheme during a commitment phase of private SAE. The flowchart 800 begins at module 802, where a passphrase assigned to an end user device for performing private SAE is determined. A passphrase assigned to an end user device can be determined by an applicable engine for determining a passphrase assigned to an end user device at a device side, such as the device side passphrase identification engines described in this paper. Depending upon implementation-specific or other considerations, a passphrase assigned to an end user device can be determined from a private SAE passphrase map represented by private SAE passphrase map data. Further depending upon implementation-specific or other considerations, a passphrase assigned to an end user device can be retrieved from local storage at the end user device. A passphrase assigned to an end user device can be determined by an application executing at the end user device.

The flowchart 800 continues to module 804, where a second random value and a second mask value at generated at the end user device, corresponding to a device side. A second random value and a second mask value can be generated by an applicable engine for generated a random value and a mask value at a device side, such as the device side private SAE commit engines described in this paper. A second random value and a second mask value can be generated according to an applicable method for generating random numbers.

The flowchart 800 continues to module 806, where a second scalar and a second element are generated using the second random value, the second mask value, and the passphrase. A second scalar and a second element can be generated by an applicable engine for generating a second scalar and a second element at the device side, such as the device side private SAE commit engines described in this paper. Depending upon implementation-specific or other considerations, a second scalar can be generated by adding the second random value and the second mask value and dividing the result by a relatively prime number. Further depending upon implementation-specific or other considerations, a second element can be generated by raising a passphrase equivalent of the passphrase assigned to the end user device by the negative of the second mask value, the second random value, or an applicable combination of the second mask value and the second random value.

The flowchart 800 continues to module 808, where the second scalar and the second element, included as part of commitment data, are sent to a network device for authenticating the end user device for a network through SAE. An applicable engine for sending the second scalar and the second element form the device side to the network side, such as the device side private SAE commit engines described in this paper. Depending upon implementation-specific or other considerations, the second scalar and the second element can be sent to a network side over a wireless connection coupling the end user device associated with the device side to a network device associated with the network side.

The flowchart 800 continues to module 810, where a first scalar and a first element are received at the device side from the network side. A first scalar and a first element can be received from an applicable engine for receiving a first scalar and a first element from the network side, such as the client side private SAE commit engines described in this paper. A first scalar and a first element can be generated at the network side from a first random value and a first mask value generated at the network side.

The flowchart 800 continues to module 812, where a shared secret is generated from the passphrase, the first scalar, and the first element. A shared secret can be generated by an applicable engine for generating a shared secret using the passphrase, the first scalar, and the first element, such as the client side private SAE commit engines described in this paper. A shared secret can also be generated using either one or an applicable combination of the second random value and the second mask value. Depending upon implementation-specific or other considerations, a shared secret can be generated by raising a passphrase equivalent of the passphrase assigned to the end user device by the first scalar, multiplying the result by the first element, raising the product to the power of the second random value or the second mask value, and dividing by the group.

Figure 9:
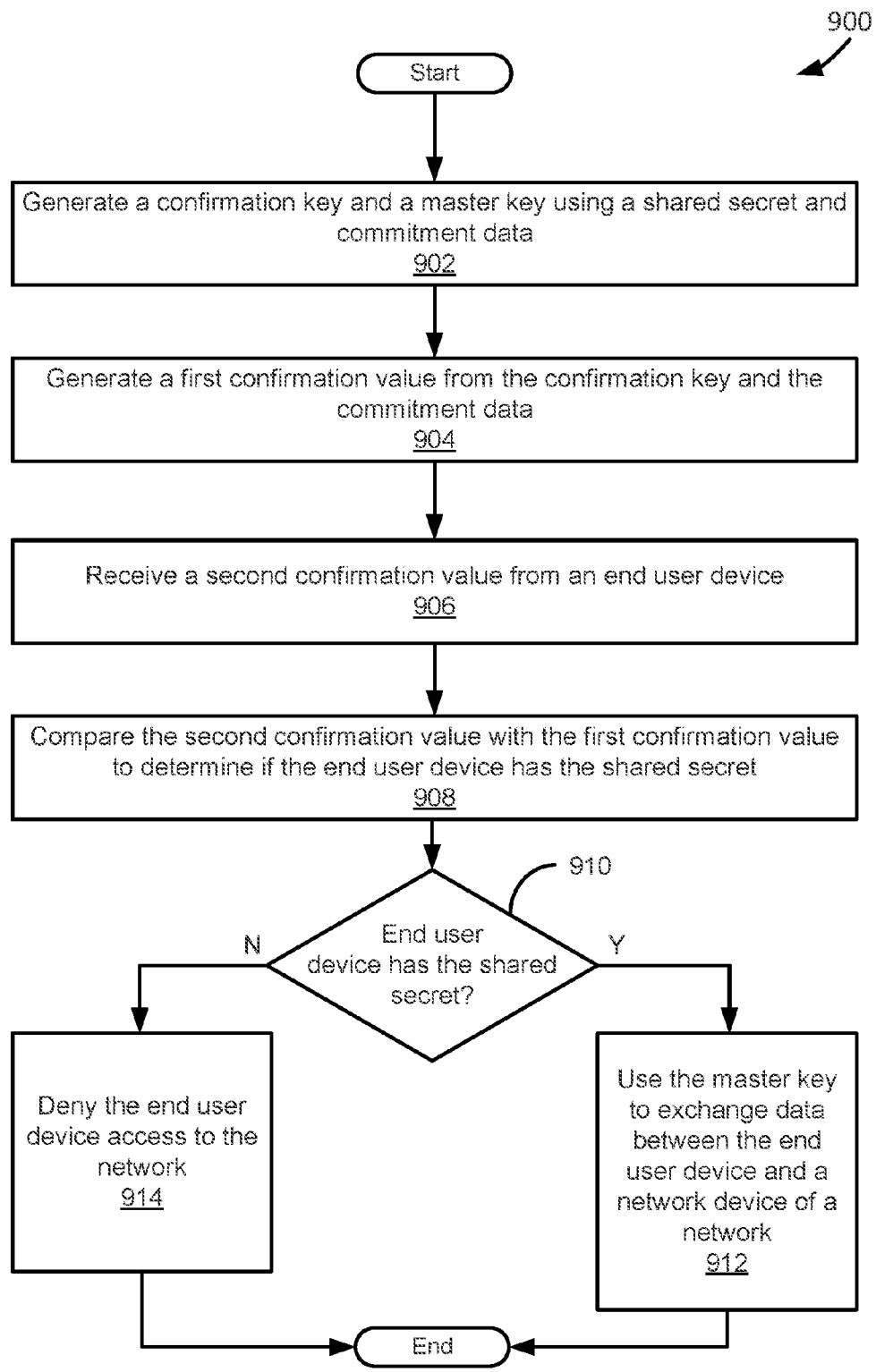
FIG. 9 depicts a flowchart of an example of a method of performing network side confirmation according to a confirmation scheme during a confirmation phase of private SAE.

FIG. 9 depicts a flowchart 900 of an example of a method of performing network side confirmation according to a confirmation scheme during a confirmation phase of private SAE. The flowchart 900 begins at module 902, where a confirmation key and a master key are generated using a shared secret and commitment data. A confirmation key and a master key can be generated by an applicable system for generating a confirmation key and a master key from a shared secret and commitment data at the network side, such as the network side private SAE confirm engines described in this paper. A shared secret used in generating a confirmation key and a master key at a network side can be generated by a network side private SAE commit engine. Commitment data used to generate a confirmation key and a master key can include a first scalar, a second scalar, a first element, and a second element. Depending upon implementation-specific or other considerations, a confirmation key and/or a master key can be generating using a key derivation function based on a shared secret generated at a network side and one or an applicable combination of a first scalar and a first element generated at the network side and a second scalar and a second element generated at the device side.

The flowchart 900 continues to module 904, where a first confirmation value is generated from the confirmation key. A first confirmation value can be generated form the confirmation key by an applicable engine for generating a first confirmation value from a confirmation key at the network side, such as the network side private SAE confirm engines described in this paper. A first confirmation value can be generated from the confirmation key and one or an applicable combination of a first scalar and a first element generated at a network side and a second scalar and a second element generated at a device side.

The flowchart 900 continues to module 906, where a second confirmation value is received at the network side from a device side. A second confirmation value, included as part of confirmation data, can be received by an applicable engine for receiving a second confirmation value at a network side from a device side, such as the network side private SAE confirm engines described in this paper. A second confirmation value can be generated at a device side from a confirmation key and one or an applicable combination of a first scalar and a first element generated at the network side and a second scalar and a second element generated at a device side.

The flowchart 900 continues to module 908, where the second confirmation value is compared with the first confirmation value to determine if the end user device has the shared secret. The second confirmation value can be compared with the first confirmation value by an applicable engine for determining if an end user device is authenticated for a network based on confirmation values, such as the network side private SAE confirm engines described in this paper. In comparing the first confirmation value with the second confirmation value, it can be determined if the shared secret used to generate a confirmation key for generating a first confirmation value is the same as the shared secret used to generate a confirmation key for generating the second confirmation value.

The flowchart 900 continues to decision point 910, where it is determined whether the end user device has the shared secret. Whether the end user device has the shared secret can be determined based on a second confirmation value received from the end user device. If it is determined at decision point 910 that the end user device has the shared secret, then the flowchart 900 continues to module 912, where the master key is used to exchange data between the end user device and a network device associated with the network side, corresponding to authentication of the end user device. If it is determined at decision point 910 that the end user device does not have the shared secret, then the flowchart 900 continues to module 914 where the end user device is denied access to the network provided through a network device.

Figure 10:
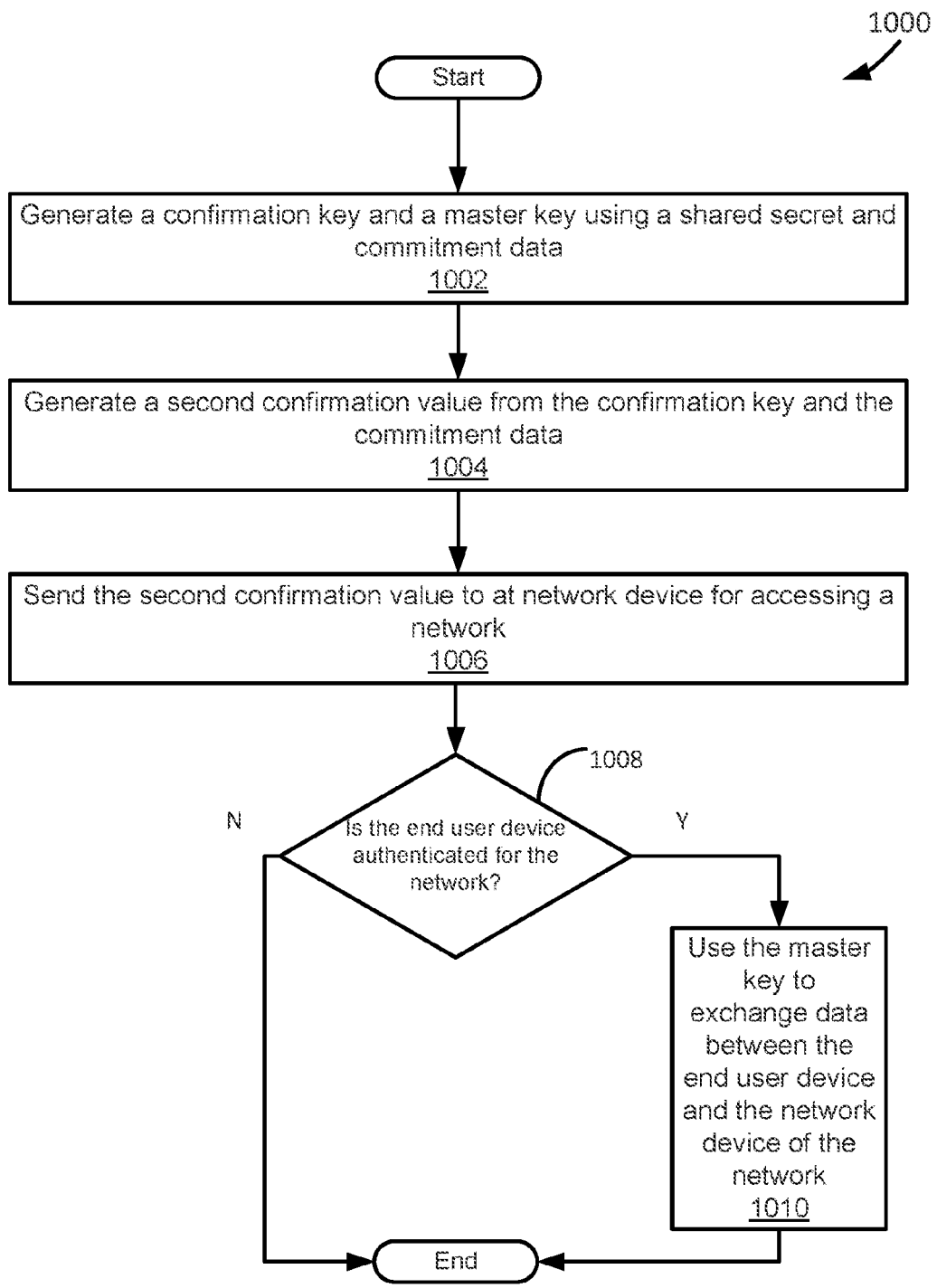
FIG. 10 depicts a flowchart of an example of a method of performing client side confirmation according to a confirmation scheme during a confirmation phase of private SAE.

FIG. 10 depicts a flowchart 1000 of an example of a method of performing client side confirmation according to a confirmation scheme during a confirmation phase of private SAE. The flowchart 1000 begins at module 1002, where a confirmation key and a master key are generated using a shared secret and commitment data. A confirmation key and a master key can be generated by an applicable system for generating a confirmation key and a master key from a shared secret and commitment data at the device side, such as the device side private SAE confirm engines described in this paper. A shared secret used in generating a confirmation key and a master key at a network side can be generated by a device side private SAE commit engine. Commitment data used to generate a confirmation key and a master key can include a first scalar, a second scalar, a first element, and a second element. Depending upon implementation-specific or other considerations, a confirmation key and/or a master key can be generating using a key derivation function based on a shared secret generated at a device side and one or an applicable combination of a first scalar and a first element generated at the network side and a second scalar and a second element generated at the device side.

The flowchart 1000 continues to module 1004, where a second confirmation value is generated from the confirmation key. A second confirmation value can be generated form the confirmation key by an applicable engine for generating a second confirmation value from a confirmation key at the device side, such as the device side private SAE confirm engines described in this paper. A second confirmation value can be generated from the confirmation key and one or an applicable combination of a first scalar and a first element generated at a network side and a second scalar and a second element generated at a device side.

The flowchart 1000 continues to module 1006, where the second confirmation value is sent to a network side from a device side. The second confirmation value, included as part of confirmation data, can be sent by an applicable engine for sending a second confirmation value from a device side, such as the device side private SAE confirm engines described in this paper. The second confirmation value can be sent through a wireless connection that couples an end user device to a network device.

The flowchart 1000 continues to decision point 1008, where it is determined if the end user device is authenticated for the network. Whether the end user device is authenticated for the network can be determined by comparing the second confirmation value with a first confirmation value generated at the network side to determine if the end user device has the shared secret. The second confirmation value can be compared with the first confirmation value by an applicable engine for determining if an end user device is authenticated for a network based on confirmation values, such as the network side private SAE confirm engines described in this paper. In comparing the first confirmation value with the second confirmation value, it can be determined if the shared secret used to generate a confirmation key, for generating a first confirmation value, is the same as the shared secret used to generate a confirmation key for generating the second confirmation value. If it is determined at decision point 1008, that the end user device is authenticated for the network, then the flowchart 1000 continues to module 1010 where the master key is used at the network side to exchange data between the user and the network device of the network.

Figure 11:
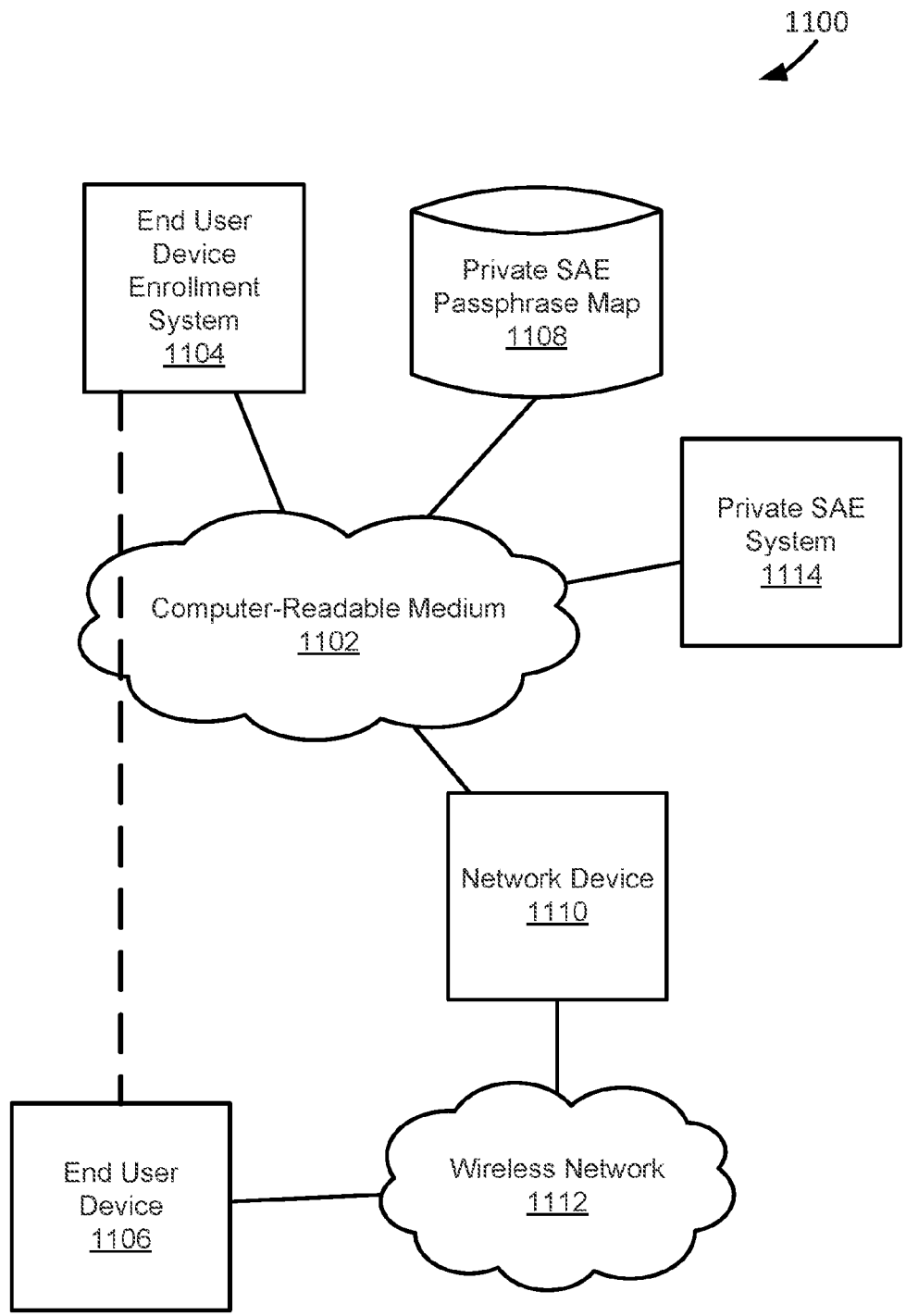
FIG. 11 depicts a diagram of an example of a system for authenticating an end user device for a network through private SAE.

FIG. 11 depicts a diagram 1100 of an example of a system for authenticating an end user device for a network through private SAE. The diagram 1100 includes a computer-readable medium 1102, an end user device enrollment system 1104 coupled to the computer readable medium 1102, an end user device 1106, a private SAE passphrase map 1108 coupled to the computer readable medium 1102, a network device 1110 coupled to the computer readable medium 1102, a wireless network 1112, and a private SAE system 1114 coupled to the computer readable medium 1102. The end user device 1106 and the network device 1110 are coupled to the wireless network 1112.

In the example of FIG. 11, the computer readable medium 1102 can be implemented in a manner similar to that of computer readable medium 102 (FIG. 1); the end user device enrollment system 1104 can be implemented in a manner similar to that of private SAE based device enrollment system 108 (FIG. 1); the end user device 1106 can be implemented in a manner similar to that of end user device 106 (FIG. 1); the private SAE passphrase map datastore 1108 can be implemented in a manner similar to that of device private SAE passphrase map 404 (FIG. 4); the network device 1110 can be implemented in a manner similar to that of network device 104 (FIG. 1); and the private SAE system 1114 can be implemented in a manner similar to that of private SAE based device authentication system 110 (FIG. 1). The wireless network 1112 is intended to represent a wireless medium within range of the network device 1110, such as a basic service area (BSA) or other applicable wireless network space. In this example, the network device 1110 is assumed to have at least wireless access point (WAP) functionality and the end user device 1106 is assumed to have the ability to establish a wireless connection with the network device 1110 if it has the appropriate credentials. Thus, to use IEEE 802.11 terminology, the network device 1110 can be referred to as an AP station on the wireless network 1112 and the end user device 1106 can be referred to as a non-AP station on the wireless network 1112.

In the example of FIG. 11, in operation, the end user device enrollment system 1104 obtains a passphrase for the end user device 1106 during an enrollment process. The passphrase can be input by a user (or agent thereof) of the end user device 1106 or by a network administrator (or agent thereof) of the network device 1110. Generation of the passphrase may or may not be automated, which can include randomly generating a passphrase. Regardless of the technique used to obtain the passphrase, the end user device enrollment system 1104 stores the passphrase in the private SAE passphrase map datastore 1108 in association with an identifier the end user device 1106. The end user device 1106 will also store the passphrase, or the passphrase is stored in such a manner as to be accessible to the end user device 1106 through a channel other than the wireless network 1112 (e.g., over a cellular network and/or from a Web server).

In the example of FIG. 11, in the continuing example of operation, the network device 1110 detects the end user device 1106 on the wireless network 1112. Using an identification of the end user device, such as a MAC address, the private SAE system 1114 can look up the passphrase stored in association with the end user device identifier using the identification of the end user device. The end user device 1106 can perform any computations necessary for SAE on the device side and the private SAE system 1114 can perform any computations necessary for SAE on the network side. Because both the network and the device know the passphrase, the computations should result in a match, which indicates the end user device 1106 should be authenticated on the network at the network device 1110.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

I claim:

1. A method comprising:
   assigning a passphrase to an end user device for onboarding the end user device to access network services of a network through a private simultaneous authentication of equals (SAE) scheme;
   storing the passphrase at a network side from the end user device in association with an identifier of the end user device;
   generating, at the network side, a shared secret as part of a commitment scheme during the private SAE scheme using the passphrase;
   determining an identification of the end user device;
   associating the passphrase with the identification of the end user device;
   updating a private SAE passphrase map to indicate an association between the passphrase and the identification of the end user device;
   creating, at the network side, a first confirmation value using the shared secret as part of a confirmation scheme during the private SAE scheme;
   receiving, at the network side, a second confirmation value from the end user device;
   comparing the first confirmation value with the second confirmation value to determine if the end user device possesses the shared secret;
   if it is determined that the end user device possesses the shared secret, using the private SAE passphrase map to authenticate the end user device to access the network services of the network through the private SAE scheme.

2. The method of claim 1, further comprising:
   generating a passphrase equivalent at the network side from the passphrase assigned to the end user device;
   authenticating the end user device to access the network services of the network through the private SAE scheme using the passphrase equivalent.

3. The method of claim 1, further comprising:
   generating, at the network side, a confirmation key and a master key using the shared secret as part of the commitment scheme during the private SAE scheme;
   creating, at the network side, the shared secret using the confirmation key as part of the commitment scheme during the private SAE scheme.

4. The method of claim 1, further comprising:
   generating, at the network side, a confirmation key and a master key as part of the commitment scheme during the private SAE scheme using a key derivation function based on the shared secret and one or a combination of a first scalar generated at the network side, a first element generated at the network side, a second scalar generated at a device side at the end user device, and a second element generated at the device side at the end user device;
   creating, at the network side, the shared secret using the confirmation key as part of the commitment scheme during the private SAE scheme.

5. The method of claim 1, further comprising:
   generating, at the network side, a confirmation key and a master key using the shared secret as part of the commitment scheme during the private SAE scheme;
   authenticating the end user device to access the network services of the network by using the master key to exchange data between the end user device and a network device as part of the end user device accessing the network services of the network.

6. The method of claim 1, wherein the passphrase assigned to the end user device is uniquely associated with the end user device for use in authenticating the end user device to access the network services of the network through the private SAE scheme or uniquely associated with a subset of end user devices including the end user device for use in authenticating the end user devices to access the network services of the network through the private SAE scheme.

7. The method of claim 1, further comprising locally installing the passphrase at the end user device for use in automatically authenticating the end user device to access network services of the network absent input from a user of the end user device.

8. The method of claim 1, further comprising:
   determining an identification of the end user device as the end user device is attempting to authenticate to access the network services of the network through the private SAE scheme;
   identifying the passphrase assigned to the end user device using the identification of the end user device determined as the end user device is attempting to authenticate to access the network services of the network through the private SAE scheme;

generating, at the network side, the shared secret using the passphrase in response to identifying the passphrase assigned to the end user device using the identification of the end user device.

9. The method of claim 1, further comprising:
receiving commitment data from the end user device as part of authenticating the end user device to access the network services of the network through the private SAE scheme;
generating the shared secret as part of the commitment data received from the end user device.

10. A system, including one or more devices, comprising:
a private simultaneous authentication of equals (SAE) based device enrollment system configured to:
assign a passphrase to an end user device for onboarding the end user device to access network services of a network through a private simultaneous authentication of equals (SAE) scheme;
store the passphrase at a network side from the end user device in association with an identifier of the end user device;
a network side private SAE commit engine configured to generate, at the network side, a shared secret as part of a commitment scheme during the private SAE scheme using the passphrase;
a device identification engine configured to determine an identification of the end user device;
a device private SAE passphrase association engine configured to:
associate the passphrase with the identification of the end user device;
update a private SAE passphrase map to indicate an association between the passphrase and the identification of the end user device, the private SAE passphrase map used to authenticate the end user device to access the network services of the network through the private SAE scheme;
a network side private SAE confirm engine configured to:
create, at the network side, a first confirmation value using the shared secret as part of a confirmation scheme during the private SAE scheme;
receive, at the network side, a second confirmation value from the end user device;
compare the first confirmation value with the second confirmation value to determine if the end user device possesses the shared secret;
authenticate the end user device to access the network services of the network through the private SAE scheme, if it is determined that the end user device possesses the shared secret.

11. The system of claim 10, wherein:
the network side private SAE commit engine is further configured to generate a passphrase equivalent at the network side from the passphrase assigned to the end user device;
the network side private SAE confirm engine is further configured to authenticate the end user device to access the network services of the network through the private SAE scheme using the passphrase equivalent.

12. The system of claim 10, wherein the network side private SAE confirm engine is further configured to:
generate, at the network side, a confirmation key and a master key using the shared secret as part of the commitment scheme during the private SAE scheme;
create, at the network side, the shared secret using the confirmation key as part of the commitment scheme during the private SAE scheme.

13. The system of claim 10, wherein the network side private SAE confirm engine is further configured to:
generate, at the network side, a confirmation key and a master key as part of the commitment scheme during the private SAE scheme using a key derivation function based on the shared secret and one or a combination of a first scalar generated at the network side, a first element generated at the network side, a second scalar generated at a device side at the end user device, and a second element generated at the device side at the end user device;
create, at the network side, the shared secret using the confirmation key as part of the commitment scheme during the private SAE scheme.

14. The system of claim 10, wherein the network side private SAE confirm engine is further configured to:
generate, at the network side, a confirmation key and a master key using the shared secret as part of the commitment scheme during the private SAE scheme;
authenticate the end user device to access the network services of the network by using the master key to exchange data between the end user device and a network device as part of the end user device accessing the network services of the network.

15. The system of claim 10, wherein the passphrase assigned to the end user device is uniquely associated with the end user device for use in authenticating the end user device to access the network services of the network through the private SAE scheme or uniquely associated with a subset of end user devices including the end user device for use in authenticating the end user devices to access the network services of the network through the private SAE scheme.

16. The system of claim 10, wherein the private SAE based device enrollment system is further configured to locally install the passphrase at the end user device for use in automatically authenticating the end user device to access network services of the network absent input from a user of the end user device.

17. The system of claim 10, wherein the network side private SAE commit engine is further configured to:
determine an identification of the end user device as the end user device is attempting to authenticate to access the network services of the network through the private SAE scheme;
identify the passphrase assigned to the end user device using the identification of the end user device determined as the end user device is attempting to authenticate to access the network services of the network through the private SAE scheme;
generate, at the network side, the shared secret using the passphrase in response to identifying the passphrase assigned to the end user device using the identification of the end user device.

18. A system comprising:
at least one processor;
memory storing instructions configured to cause the at least one processor to perform:
assigning a passphrase to an end user device for onboarding the end user device to access network services of a network through a private simultaneous authentication of equals (SAE) scheme;
storing the passphrase at a network side from the end user device in association with an identifier of the end user device;
generating, at the network side, a shared secret as part of a commitment scheme during the private SAE scheme using the passphrase;

determining an identification of the end user device;
associating the passphrase with the identification of the end user device;
updating a private SAE passphrase map to indicate an association between the passphrase and the identification of the end user device;
creating, at the network side, a first confirmation value using the shared secret as part of a confirmation scheme during the private SAE scheme;
receiving, at the network side, a second confirmation value from the end user device;
comparing the first confirmation value with the second confirmation value to determine if the end user device possesses the shared secret;
authenticating, using the private SAE passphrase map, the end user device to access the network services of the network through the private SAE scheme, if it is determined that the end user device possesses the shared secret.

* * * * *